US008503447B2

(12) United States Patent

Lee et al.

(10) Patent No.: US 8,503,447 B2
(45) Date of Patent: Aug. 6, 2013

(54) BROADCAST RECEIVER AND CHANNEL INFORMATION PROCESSING METHOD

(75) Inventors: Joon Hui Lee, Seoul (KR); Sang Hoon Cha, Seongnam-si (KR); Jae Hyung Song, Seoul (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 12/232,535

(22) Filed: Sep. 18, 2008

(65) Prior Publication Data

US 2009/0086731 A1 Apr. 2, 2009

Related U.S. Application Data

(60) Provisional application No. 60/973,776, filed on Sep. 20, 2007.

(51) Int. Cl.
*H04L 12/28* (2006.01)
*H04J 3/16* (2006.01)
*G06F 3/00* (2006.01)

(52) U.S. Cl.
USPC ............. 370/390; 370/392; 370/437; 725/38; 725/50; 725/105

(58) Field of Classification Search
USPC ........... 370/389, 390, 392, 437, 474; 725/34, 725/38, 48, 50, 105
See application file for complete search history.

(56) References Cited

U.S. PATENT DOCUMENTS

2007/0040933 A1* 2/2007 Seong ........................ 348/385.1
2007/0064637 A1* 3/2007 Lee et al. ...................... 370/312
2007/0100984 A1 5/2007 Jansky et al.
2007/0130604 A1* 6/2007 Han et al. ...................... 725/131
2007/0256098 A1* 11/2007 Yum .............................. 725/38
2007/0266123 A1* 11/2007 Johannesson et al. ........ 709/220

FOREIGN PATENT DOCUMENTS

WO WO 2004/056096 A1 7/2004
WO WO 2005/112312 A1 11/2005

OTHER PUBLICATIONS

ETSI TS 102 034: Digital Video Broadcasting (DVB): Transport of MPEG-2 Based DVB Services over IP Based Networks, Mar. 2005, European Telecommunications Standards Institute, Version 1.1.1, pp. 21-23, 26-29, 37-44.*

ETSI TS 102 034 v1.2.1 (Sep. 2006), Technical Specification, "Digital Video Broadcasting (DVB); Transport of MPEG-2 Based DVB Services over IP ased Networks", European Broadcasting Union, ETSI.

* cited by examiner

*Primary Examiner* — Andrew Lee

(74) *Attorney, Agent, or Firm* — McKenna Long & Aldridge LLP

(57) ABSTRACT

A broadcast receiver and a channel information processing method are disclosed. A network interface transmits and receives an Internet Protocol (IP) packet. A controller detects broadcast data included in the IP packet received by the network interface and parses the detected broadcast data to obtain virtual channel information and physical channel information. The channel information is transmitted based on service discovery & selection (SD&S). The virtual channel information is transmitted in a broadcast discovery record and the physical channel information is transmitted in a cable network information record.

10 Claims, 27 Drawing Sheets

FIG. 4

| Payload ID Value | SD & S record carried |
|---|---|
| 0x00 | Reserved |
| 0x01 | Service Provider Discovery Information |
| 0x02 | Broadcast Discovery Information |
| 0x03 | COD Discovery Information |
| 0x04 | Service from other SPs |
| 0x05 | Package Discoverey Information |
| 0x06 | BCG Discovery Information |
| 0x07 | Cable Network Information |
| 0x08 to 0xEF | Reserved |
| 0xF0 to 0xFF | User Private |

FIG. 7

| Syntax | Bits | Bytes | Format |
|---|---|---|---|
| Shortform_virtual_channel_table_section() { | | | |
| table_ID | 8 | 1 | uimsbf value 0xC4 |
| zero | 2 | 2 | bslbf |
| reserved | 2 | | bslbf |
| section_length | 12 | | uimsbf |
| zero | 3 | 1 | bslbf |
| protocol_version | 5 | | uimsbf |
| transmission_medium | 4 | 1 | uimsbf |
| table_subtype | 4 | | uimsbf |
| VCT_ID | 16 | 2 | uimsbf |
| if(table_subtype==DCM) { | | | |
| DCM_structure() | | | |
| } | | | |
| if(table_subtype==VCM) { | | | |
| VCM_structure() | | | |
| } | | | |
| if(table_subtype==ICM) { | | | |
| ICM_structure() | | | |
| } | | | |
| for(i=0; i<N; i++) { | | | |
| desriptor() | | | optional |
| } | | | |
| CRC_32 | 32 | 4 | rpchof |
| } | | | |

FIG. 8

| Syntax | Bits | Bytes | Format |
|---|---|---|---|
| VCM_structure() { | | | |
| zero | 2 | 1 | bslbf |
| descriptors_included | 1 | | bslbf {no, yes} |
| zero | 5 | | bslbf |
| splice | 1 | 1 | bslbf {no, yes} |
| zero | 7 | | bslbf |
| activation_time | 32 | 4 | uimsbf |
| number_of_VC_records | 8 | 1 | |
| for(i=0; i<number_of_VC_records; i++) { | | | |
| virtual_channel() | | | |
| } | | | |
| } | | | |

FIG. 9

| Syntax | Bits | Bytes | Format |
|---|---|---|---|
| virtual_channel() { | | | |
| zero | 4 | 2 | bslbf |
| virtual_channel_number | 12 | | uimsbf range 0-4095 |
| application_virtual_channel | 1 | 1 | bslbf {no, yes} |
| zero | 1 | | bslbf |
| path_select | 1 | | bslbf |
| transport_type | 1 | | bslbf |
| channel_type | 4 | | uimsbf |
| if(application_virtual_channel) { | | | |
| applicationo_ID | 16 | (2) | |
| } else { | | | |
| source_ID | 16 | (2) | |
| } | | | |
| if(transport_type==MPEG_2) { | | | |
| CDS_reference | 8 | ((1)) | uimsbf range 1-255 |
| program_number | 16 | ((2)) | |
| MMS_reference | 8 | ((1)) | uimsbf range 1-255 |
| } else { | | | |
| CDS_reference | 8 | ((1)) | uimsbf range 1-255 |
| scrambled | 1 | ((1)) | bslbf {no, yes} |
| zero | 3 | | bslbf |
| video_standard | 4 | | uimsbf |
| zero | 16 | ((2)) | |
| } | | | |
| if(descriptors_included) { | | | |
| descriptors_count | 8 | (1) | uimsbf |
| for(i=0; i<descriptors_count; i++) { | | | |
| descriptors() | | | |
| } | | | |
| } | | | |
| } | | | |

FIG. 10A

| Element / Attribute Name | Element / Attribute Description | Mandated/ Optional |
|---|---|---|
| BroadcastOffering type: | /BroadcastDiscovery | |
| VirtualChannelList type (one per virtual list) | /BroadcastDiscovery/VirtualChannelList | |
| VirtualChannelList@VCTId | A 16-bit unsigned integer value, in the range 0x0000 to 0xFFFF, indicating the VCT to which the channel definitions in this table section apply. This 16-bit field may be used by the POD module for filtering purposes. The Host is expected to ignore VCT_ID. Only one version of the S-VCT, corresponding to one value of VCT_ID, shall be delivered to the Host across the Extended Channel interface at a given time. | M |
| ActivationTime | A 32-bit unsigned integer field providing the absolute second the virtual channel data carried in the table section will be valid. If the activation_time is in the past, the data in the table section shall be considered valid immediately. An activation_time value of zero shall be used to indicate immediate activation | M |
| DefinedChannelList type | /BroadcastDiscovery/VirtualChannelList/DefinedChannelList | |
| SingleDefinedChannel | Specifies the defined virtual channel or virtual channel range. | M |
| VCDescriptionLocation | If present, this shall contain the identifier(s) of the BCG Record(s) for the BCG Discovery element that carries the information on this offering. | O |
| ServicesDescriptionLocation @preferred | If present and set to true, specifies that this location contains the preferred BCG. The default value for this attribute is false. There shall be only one preferred BCG. | O |
| VirtualChannel type (one entry per virtual channel): | /BroadcastDiscovery/VirtualChannelList/SingleVirtualChannel | |
| SingleVirtualType@ ChannelType | A 4-bit field defining the channel type. This shall use a value of Table 5.20 defined in SCTE 65. | M |
| VirtualChannelNumber | An unsigned 12-bit integer, in the range zero to 4095, reflecting the virtual channel whose definition is being provided by this virtual channel record, for the map identified by the VCT_ID field. | M |
| TextualIdentifier@ DomainName | An internet DNS domain name registered by the Service Provider that uniquely identifies the Service Provider. If this is not present, then the DNS domain name from the DVB IP Offering record is used. | O |
| TextualIdentifier@ ServiceName | A unique host name for the service within the service provider's domain. | O |
| ApplicationAccessPoint | Identifies a access point whichs is defined by this virtual channel. This is either application_id or source_id. | O |
| ServiceSource type: | /BroadcastDiscovery/VirtualChannelList/SingleVirtualChannel/ ChannelSource | |
| VirtualChannelLocation type: | /BroadcastDiscovery/VirtualChannelList/SingleVirtualChannel/ ChannelSource/VirtualChannelLocation | |

FIG. 10B

| Element / Attribute Name | Element / Attribute Description | Mandated/ Optional |
|---|---|---|
| IPMulticastAddress | Signals the use of IGMP to access the virtual channel and provides the multicast address at which the virtual channel may be accessed. | O |
| RTSPURL | Signals the use of RTSP to access the virtual channel and provides the URL at which the virtual channel may be accessed. | O |
| DigitalCableServiceLocation | Signals the use of the digital cable to access the virtual channel and provides the frequency and modulation information at which the virtual channel may be accessed. | O |
| AnalogCableServiceLocation | Signals the use of the analog cable to access the virtual channel and provides the frequency information at which the virtual channel may be accessed. | O |
| ProgramNumber | Identifies a service from any other service within the present document. | M |
| Max Bitrate | Specifies the maximum bitrate of the overall stream carrying the preview service | O |
| AudioAttributes | Signals details of the audio coding algorithms and purpose that the preview service may use. This shall take the form of the AudioAttributtes element defined in clause 6.1.1.1 of TS 102 822-3-3 [70] and used in TS 102 323 [69]. The classification schema used for the Coding element shall either be defined by TS 102 323 [69], or provided by the present document. If this element is omitted, then the default value of MPEG-1 or MPEG-2 layer 2 backwards compatible, mono or stereo and shall be the "normal" audio; specifically this shall be the legacy value from TS 101 154 [68] | O |
| VideoAttributes | Signals details of the video coding that may be used by the service. This shall take the form of the VideoAttributes element defined in clause 6.1.1.2 of TS 102 822-3-3 [70] and used in TS 102 323 [69]. The classification schema used for the Coding element shall either be defined by TS 102 323 [69], or provided by the present document. If this element is omitted, then the default value of MPEG-2 coded video, operating at MP@LL at a frame rate of 25Hz shall be used; specifically this shall be the legacy value from TS 101 154 [68]. | O |

FIG. 12

| Syntax | Bits | Bytes | Format |
|---|---|---|---|
| DCM_structure(){ | | | |
| zero | 4 | 2 | bslbf |
| first_virtual_channel | 12 | | uimsbf range 0-4095 |
| zero | 1 | 1 | bslbf |
| DCM_data_length | 7 | | uimsbf range 1-127 |
| for(i=0;i<DCM_data_length;i++){ | | | |
| range_defined | 1 | (1) | bslbf{no,yes} |
| channels_count | 7 | | uimsbf range 1-127 |
| } | | | |
| } | | | |

FIG. 13

| Element / Attribute Name | Element / Attribute Description | Mandated/ Optional |
|---|---|---|
| DefinedChannelList type | /BroadcastDiscovery/VirtualChannelList/DefinedChannelList | |
| SingleDefinedChannel | Specifies the defined virtual channel or virtual channel range. | M |
| DefinedChannelNumber | Specifies a defined virtual channel. | M |
| DefinedChannelRange | Specifies a defined virtual channel range. | M |
| FirstDefiendChannelNumber | Specifies the first virtual channel number of the defined range. | M |
| LastDefiendChannelNumber | Specifies the last virtual channel number of the defined range. | M |

FIG. 14A

```
<xsd:complexType name="BroadcastOffering">
  <xsd:annotation>
    <xsd:documentation xml:lang="en">Provides a list of TS or services discovery information</xsd:documentation>
  </xsd:annotation>
  <xsd:complexContent>
    <xsd:extension base="dvb:OfferingBase">
      <xsd:sequence>
        <xsd:element name="VirtualChannelList" maxOccurs="unbounded">
          <xsd:complexType>
            <xsd:complexContent>
              <xsd:extension base="dvb:VirtualChannelList"/>
            </xsd:complexContent>
          </xsd:complexType>
        </xsd:element>
      </xsd:sequence>
    </xsd:extension>
  </xsd:complexContent>
</xsd:complexType>

<xsd:complexType name="VirtualChannel">
  <xsd:sequence>
    <xsd:element name="VirtualChannelNumber" type="dvb:VirtualChannelNumber"/>
    <xsd:element name="TextualIdentifier" type="dvb:TextualIdentifier" minOccurs="0"/>
    <xsd:element name="AccessPoint" type="dvb:AccessPoint"/>
    <xsd:element name="ChannelSource" type="dvb:ServiceSource" maxOccurs="unbounded"/>
    <xsd:element name="SI" type="dvb:SI" minOccurs="0"/>
  </xsd:sequence>
  <xsd:attribute name="ChannelType" type="dvb:ChannelType" use="required"/>
</xsd:complexType>

<xsd:complexType name="VirtualChannelList">
  <xsd:sequence>
    <xsd:element name="VCDescriptionLocation" type="dvb:DescriptionLocationBCG" minOccurs="0" maxOccurs="unbounded"/>
    <xsd:element name="DefinedChannelList" type="dvb:DefinedChannelList"/>
    <xsd:sequence>
      <xsd:element name="SingleVirtualChannel" type="dvb:VirtualChannel" maxOccurs="unbounded"/>
    </xsd:sequence>
  </xsd:sequence>
  <xsd:attribute name="VCTId" type="xsd:unsignedShort" use="required"/>
  <xsd:attribute name="ActivationTime" type="xsd:dateTime" use="required"/>
</xsd:complexType>

<xsd:complexType name="ServiceSource">
  <xsd:sequence>
    <xsd:element name="VirtualChannelLocation" type="dvb:ServiceLocation"/>
    <xsd:element name="ProgramNumber" type="dvb:ServiceId"/>
    <xsd:element name="MaxBitrate" type="xsd:positiveInteger" minOccurs="0"/>
    <xsd:element name="AudioAttributes" type="tva:AudioAttributesType" minOccurs="0" maxOccurs="unbounded"/>
    <xsd:element name="VideoAttributes" type="tva:VideoAttributesType" minOccurs="0" maxOccurs="unbounded"/>
    <xsd:element name="ServiceAvailability" type="dvb:ServiceAvailabilityType" minOccurs="0" maxOccurs="unbounded"/>
  </xsd:sequence>
</xsd:complexType>

<xsd:complexType name="ServiceLocation">
  <xsd:annotation>
    <xsd:documentation xml:lang="en">The location of a service. Currently this supports either a multicast address
                                     (ASM and SSM) or RTSP.</xsd:documentation>
  </xsd:annotation>
  <xsd:choice maxOccurs="unbounded">
    <xsd:element name="IPMulticastAddress" type="dvb:McastType"/>
    <xsd:element name="RTSPURL" type="dvb:RTSP"/>
    <xsd:element name="DigitalCableServiceLocation" type="dvb:DigitalCableServiceLocation"/>
    <xsd:element name="AnaloglCableServiceLocation" type="dvb:AnalogCableServiceLocation"/>
  </xsd:choice>
</xsd:complexType>
```

FIG. 14B

```
<xsd:simpleType name="CDSReference">
   <xsd:restriction base="xsd:integer">
     <xsd:minInclusive value="0"/>
     <xsd:maxInclusive value="255"/>
   </xsd:restriction>
 </xsd:simpleType>
 <xsd:simpleType name="MMSReference">
   <xsd:restriction base="xsd:integer">
     <xsd:minInclusive value="0"/>
     <xsd:maxInclusive value="255"/>
   </xsd:restriction>
 </xsd:simpleType>
 <xsd:complexType name="DigitalCableServiceLocation">
   <xsd:attribute name="TransmissionPath" type="dvb:TransmissionPath" use="required"/>
   <xsd:attribute name="CDSReference" type="dvb:CDSReference" use="required"/>
   <xsd:attribute name="MMSReference" type="dvb:MMSReference" use="required"/>
 </xsd:complexType>
 <xsd:complexType name="AnalogCableServiceLocation">
   <xsd:attribute name="TransmissionPath" type="dvb:TransmissionPath" use="required"/>
   <xsd:attribute name="CDSReference" type="dvb:CDSReference" use="required"/>
   <xsd:attribute name="Scrambled" type="xsd:boolean" use="required"/>
   <xsd:attribute name="VideoStandard" type="dvb:Hexadecimal4bit" use="required"/>
 </xsd:complexType>
 <xsd:simpleType name="MajorChannelNumber">
   <xsd:restriction base="xsd:unsignedInt">
     <xsd:minInclusive value="0"/>
     <xsd:maxInclusive value="999"/>
   </xsd:restriction>
 </xsd:simpleType>
 <xsd:simpleType name="MinorChannelNumber">
   <xsd:restriction base="xsd:unsignedInt">
     <xsd:minInclusive value="0"/>
     <xsd:maxInclusive value="999"/>
   </xsd:restriction>
 </xsd:simpleType>
 <xsd:simpleType name="OnePartChannelNumber">
   <xsd:restriction base="xsd:unsignedShort">
     <xsd:minInclusive value="0"/>
     <xsd:maxInclusive value="4095"/>
   </xsd:restriction>
 </xsd:simpleType>
 <xsd:complexType name="TwoPartChannelNumber">
   <xsd:sequence>
     <xsd:element name="MajorChannelNumber" type="dvb:MajorChannelNumber"/>
     <xsd:element name="MinorChannelNumber" type="dvb:MinorChannelNumber"/>
   </xsd:sequence>
 </xsd:complexType>
 <xsd:complexType name="VirtualChannelNumber">
   <xsd:choice>
     <xsd:element name="OnePartChannelNumber" type="dvb:OnePartChannelNumber"/>
     <xsd:element name="TwoPartChannelNumber" type="dvb:TwoPartChannelNumber"/>
   </xsd:choice>
 </xsd:complexType>
 <xsd:simpleType name="SourceID">
   <xsd:restriction base="xsd:unsignedShort"/>
 </xsd:simpleType>
 <xsd:simpleType name="ApplicationID">
   <xsd:restriction base="xsd:unsignedShort"/>
 </xsd:simpleType>
 <xsd:complexType name="AccessPoint">
   <xsd:choice>
     <xsd:element name="ApplicationID" type="dvb:ApplicationID"/>
     <xsd:element name="SourceID" type="dvb:SourceID"/>
   </xsd:choice>
 </xsd:complexType>
```

FIG. 14C

```
<xsd:simpleType name="TransmissionPath">
    <xsd:restriction base="xsd:string">
      <xsd:enumeration value="Path0"/>
      <xsd:cnumcration valuc="Path1"/>
    </xsd:restriction>
  </xsd:simpleType>
  <xsd:simpleType name="ChannelType">
    <xsd:restriction base="dvb:Hexadecimal4bit"/>
  </xsd:simpleType>
 <xsd:complexType name="DefinedChannel">
    <xsd:choice>
      <xsd:element name="DefinedChannelNumber" type="dvb:OnePartChannelNumber"/>
      <xsd:clemcnt namc="DcfincdChanncIRangc">
        <xsd:complexType>
          <xsd:sequence>
            <xsd:element name="FirstChannelNumber" type="dvb:OnePartChannelNumber"/>
            <xsd:element name="LastChannelNumber" type="dvb:OnePartChannelNumber"/>
          </xsd:sequence>
        </xsd:complexType>
      </xsd:element>
    </xsd:choice>
  </xsd:complcxTypc>
  <xsd:complexType name="DefinedChannelList">
    <xsd:sequence>
      <xsd:element name="SingeDefinedChannel" type="dvb:DefinedChannel" maxOccurs="unbounded"/
    </xsd:sequcnce>
  </xsd:complexType>
```

FIG. 16

| Syntax | Bits | Bytes | Format |
|---|---|---|---|
| network_info_table_section(){ | | | |
| table_ID | 8 | 1 | uimsbf value 0xC2 |
| zero | 2 | 2 | bslbf |
| reserved | 2 | | bslbf |
| section_length | 12 | | uimsbf |
| zero | 3 | 1 | bslbf |
| protocol_version | 5 | | |
| first_index | 8 | 1 | uimsbf range 1-255 |
| number_of_records | 8 | 1 | uimsbf |
| transmission_medium | 4 | 1 | uimsbf |
| table_subtype | 4 | | uimsbf |
| for (i=0; i<number_of_records; i++) { | | | |
| if (table_subtype == CDS) { | | | |
| CDS_record() | | ((5)) | |
| } | | | |
| if (table_subtype == MMS) { | | | |
| MMS_record() | | ((6)) | |
| } | | | |
| descriptors_count | 8 | ((1)) | uimsbf range 0-255 |
| for (i=0; descriptors_count; i++) { | | | |
| descriptor() | | | |
| } | | | |
| } | | | |
| for (i=0; i<N; i++) { | | | |
| descriptor() | | | optional |
| } | | | uimsbf |
| CRC_32 | 32 | 4 | rpchof |
| } | | | |

FIG. 17

| Syntax | Bits | Bytes | Format |
|---|---|---|---|
| CDS_record(){ | | | |
| number_of_carriers | 8 | 1 | uimsbf value 0xC2 |
| spacing_unit | 1 | 2 | bslbf |
| zero | 1 | | bslbf |
| frequency_spacing | 14 | | uimsbf range 1-16,383 units of 10 or 125kHz |
| frequency_unit | 1 | 2 | bslbf |
| first_carrier_frequency | 15 | | uimsbf range 0-32,767 units of 10 or 125kHz |
| } | | | |

FIG. 18

| Syntax | Bits | Bytes | Format |
|---|---|---|---|
| MMS_record(){ | | | |
| transmission_system | 4 | 1 | uimsbf |
| inner_coding_mode | 4 | | uimsbf |
| split_bitstream_mode | 1 | 1 | bslbf {no. yes} |
| zero | 2 | | bslbf |
| modulation_format | 5 | | uimsbf |
| zero | 4 | 4 | bslbf |
| symbol_rate | 28 | | uimsbf range 0-32,767 |
| } | | | |

FIG. 19

| Element / Attribute Name | Element / Attribute Description | Mandated/ Optional |
|---|---|---|
| CableNetworkInformation type | /CableNetworkInformation | |
| CarrierDefinitionList type : | /CableNetworkInformation/CarrierDefinitionList | |
| CarrierDefinitionList@ FirstIndex | An 8-bit unsigned integer number in the range one to 255 that indicates the index of the first record to be defined in this element. If more than one record is provided, the additional records define successive table entries following first_index. The value zero is illegal and shall not be specified. If this is not present, then the default value is 1. | O |
| CarrierDefinition type (one entry per carrier definition): | /CableNetworkInformation/CarrierDefinitionList/ CarrierDefinition | |
| NumberOfCarriers | An unsigned integer in the range 1 to 255 that represents the number of carriers whose frequency is being defined by this element. | M |
| FrequencySpacing type | /CableNetworkInformation/CarrierDefinitionList/ CarrierDefinition/FrequencySpacing | |
| FrequencySpacing @SpacingUnit | A 1-bit field identifying the units for the frequency_spacing field as either being an 10 kHz units, or 125 kHz units. | M |
| FirstCarrierFrequency | A 14-bit unsigned integer number in the range one to 16,383 that defines the frequency spacing in units of either 10 kHz or 125 kHz, depending upon the value of the spacing_unit parameter. If spacing_unit is zero, indicating 10 kHz, then a value of one indicates 10 kHz spacing; two indicates 20 kHz, and so on. If the number_of_carriers field is one, the frequency_ spacing field is ignored. The maximum frequency spacing that can be represented is (214-1) * 125 kHz = 2047.875 MHz. The minimum frequency spacing is 10 kHz. | M |
| FirstCarrierFrequency type | /CableNetworkInformation/CarrierDefinitionList/ CarrierDefinition/ FirstCarrierFrequency | |
| FirstCarrierFrequency @FrequencyUnit | A 1-bit field identifying the units for the frequency_spacing field as either being an 10 kHz units, or 125 kHz units . | M |
| FirstCarrierFrequency | A 15-bit unsigned integer number in the range 0 to 32,767 that defines the starting carrier frequency for the carriers defined in this group, in units of either 10 kHz or 125 kHz, depending on the value of frequency_unit. If only one carrier is defined for the group, the first_carrier_frequency represents its frequency. When the frequency_unit indicates 125 kHz, the first_carrier_frequency can be interpreted as a fractional frequency (1/8 MHz) in the least-significant 3 bits, and an integer number of megahertz in the upper 12 bits. The range of frequencies that can be represented is 0 to (215 -1) * 125 kHz = 4095.875 MHz. | M |

FIG. 20

| Transmission_system | meaning |
|---|---|
| 0 | unknown-The transmission system is not known |
| 1 | Reserved (STSI) |
| 2 | ITU-T annex B-The transmission system conforms to the ITU North American strandard specified in Annex B of ITU Rec. J.83 [14] |
| 3 | Defined for use in other systems |
| 4 | ATSC-The transmission system conforms to the ATSC Digital Television standard [4] |
| 5-15 | Reserved (satellite) |

FIG. 21

| inner_coding_mode | meaning |
|---|---|
| 0 | rate 5/11 coding |
| 1 | rate 1/2 coding |
| 2 | Reserved |
| 3 | rate 3/5 coding |
| 4 | Reserved |
| 5 | rate 2/3 coding |
| 6 | Reserved |
| 7 | rate 3/4 coding |
| 8 | rate 4/5 coding |
| 9 | rate 5/6 coding |
| 10 | Reserved |
| 11 | rate 7/8 coding |
| 12-14 | Reserved |
| 15 | none-indicates that the waveform does not use concatenated coding |

FIG. 22

| modulation_format | meaning |
|---|---|
| 0 | unknown-The modulation format is unknown |
| 1 | QPSK-The modulation format is QPSK (Quadrature Phase Shift Keying) |
| 2 | BPSK-The modulation format is BPSK (Binary Phase Shift Keying) |
| 3 | OQPSK-The modulation format is offset QPSK |
| 4 | VSB 8-The modulation format is 8-level VSB (Vestigial Sideband) |
| 5 | VSB 16-The modulation format is 16-level VSB |
| 6 | QAM 16-Modulation format 16-level Quadrature Amplitude Modulation (QAM) |
| 7 | QAM 32-32_level QAM |
| 8 | QAM 64-64_level QAM |
| 9 | QAM 80-80_level QAM |
| 10 | QAM 96-96_level QAM |
| 11 | QAM 112-112_level QAM |
| 12 | QAM 128-128_level QAM |
| 13 | QAM 160-160_level QAM |
| 14 | QAM 192-192_level QAM |
| 15 | QAM 224-224_level QAM |
| 16 | QAM 256-256_level QAM |
| 17 | QAM 320-320_level QAM |
| 18 | QAM 384-384_level QAM |
| 19 | QAM 448-448_level QAM |
| 20 | QAM 512-512_level QAM |
| 21 | QAM 640-640_level QAM |
| 22 | QAM 768-768_level QAM |
| 23 | QAM 896-896_level QAM |
| 24 | QAM 1024-1024_level QAM |
| 25-31 | Reserved |

FIG. 23A

```
<xsd:simpleType name="FrequencyUnit">
  <xsd:restriction base="xsd:string">
    <xsd:enumeration value="10kHz"/>
    <xsd:enumeration value="125kHz"/>
  </xsd:restriction>
</xsd:simpleType>
<xsd:complexType name="FrequencySpacing">
  <xsd:sequence>
    <xsd:element name="FrequencySpacingMultiplier">
      <xsd:simpleType>
        <xsd:restriction base="xsd:unsignedShort">
          <xsd:minInclusive value="1"/>
          <xsd:maxInclusive value="16383"/>
        </xsd:restriction>
      </xsd:simpleType>
    </xsd:element>
  </xsd:sequence>
  <xsd:attribute name="SpacingUnit" type="dvb:FrequencyUnit" use="required"/>
</xsd:complexType>
<xsd:complexType name="FirstCarrierFrequency">
  <xsd:sequence>
    <xsd:element name="FrequencyMultiplier">
      <xsd:simpleType>
        <xsd:restriction base="xsd:unsignedShort">
          <xsd:minInclusive value="0"/>
          <xsd:maxInclusive value="32768"/>
        </xsd:restriction>
      </xsd:simpleType>
    </xsd:element>
  </xsd:sequence>
  <xsd:attribute name="FrequencyUnit" type="dvb:FrequencyUnit" use="required"/>
</xsd:complexType>
<xsd:complexType name="CarrierDefinition">
  <xsd:sequence>
    <xsd:element name="NumberOfCarriers" type="xsd:unsignedByte"/>
    <xsd:element name="FrequencySpacing" type="dvb:FrequencySpacing"/>
    <xsd:element name="FirstCarrierFrequency" type="dvb:FirstCarrierFrequency"/>
  </xsd:sequence>
</xsd:complexType>
<xsd:complexType name="CarrierDefinitionList">
  <xsd:sequence>
    <xsd:element name="CarrierDefinition" type="dvb:CarrierDefinition" maxOccurs="unbounded"/>
  </xsd:sequence>
  <xsd:attribute name="FirtstIndex" type="xsd:unsignedByte" use="optional" default="1"/>
</xsd:complexType>
```

FIG. 23B

```
<xsd:complexType name="ModulationMode">
  <xsd:sequence>
    <xsd:element name="TransmissionSystem" type="dvb:Hexadecimal4bit"/>
    <xsd:element name="InnerCodingMode" type="dvb:Hexadecimal4bit"/>
    <xsd:element name="SplitBitstreamMode" type="xsd:boolean"/>
    <xsd:element name="ModulationFormat">
      <xsd:simpleType>
        <xsd:restriction base="xsd:unsignedByte">
          <xsd:minInclusive value="0"/>
          <xsd:maxInclusive value="31"/>
        </xsd:restriction>
      </xsd:simpleType>
    </xsd:element>
    <xsd:element name="SymbolRate">
      <xsd:simpleType>
        <xsd:restriction base="xsd:unsignedLong">
          <xsd:minInclusive value="0"/>
          <xsd:maxInclusive value="268435456"/>
        </xsd:restriction>
      </xsd:simpleType>
    </xsd:element>
  </xsd:sequence>
</xsd:complexType>
<xsd:complexType name="ModulationModeList">
  <xsd:sequence>
    <xsd:element name="MouldationMode" type="dvb:ModulationMode" maxOccurs="unbounded"/>
  </xsd:sequence>
  <xsd:attribute name="FirstIndex" type="xsd:unsignedByte" use="optional" default="1"/>
</xsd:complexType>
<xsd:complexType name="CableNetworkInformation">
  <xsd:choice maxOccurs="unbounded">
    <xsd:element name="CarrierDefinitionList" type="dvb:CarrierDefinitionList"/>
    <xsd:element name="ModulationModeList" type="dvb:ModulationModeList"/>
  </xsd:choice>
</xsd:complexType>
```

BROADCAST RECEIVER AND CHANNEL INFORMATION PROCESSING METHOD

This application claims the benefit of the U.S. Provisional Application No. 60/973,776, filed on Sep. 20, 2007, which is hereby incorporated by reference as if fully set forth herein.

BACKGROUND OF THE INVENTION

1. Field of the Invention

The present invention relates to broadcast data processing methods, and more particularly, to a broadcast receiver and a channel information processing method.

2. Discussion of the Related Art

Existing broadcasting services have been provided in such a manner that contents produced by broadcasting companies are transmitted through radio transmission media, such as terrestrial waves, cables or satellites, and the user watches the transmitted contents through a broadcast receiver capable of receiving the transmitted contents via the respective transmission media.

However, as digital broadcasting technologies based on digital broadcasting are developed and are commercially available, breaking from existing analog broadcasting, various content services, such as real-time broadcasts, Contents on Demand (CoD), games and news, can be provided to the user using an Internet network connected to each home, besides the existing transmission media.

An Internet Protocol television (IPTV) may be taken as an example of the provision of content services using the Internet network. The IPTV refers to transmitting and providing various information services, moving image contents, broadcasts, etc. to the user's receiver using the Internet network. The Internet network can be implemented based on an Internet Protocol (IP) on various networks including an optical cable network, coaxial cable network, Fiber To The Home (FTTH), telephone network, wireless network, etc.

In the provision of services using the Internet network, as mentioned above, differently from general terrestrial broadcasting, etc., bidirectionality can be additionally provided and the user can watch a desired content service at his/her convenient time.

SUMMARY OF THE INVENTION

Accordingly, the present invention is directed to a broadcast receiver and a channel information processing method that substantially obviate one or more problems due to limitations and disadvantages of the related art.

An object of the present invention is to provide a broadcast receiver and a channel information processing method which can process service information.

Another object of the present invention is to provide a broadcast receiver and a channel information processing method which can process service information to efficiently set a channel.

Another object of the present invention is to provide a broadcast receiver and a channel information processing method which can process information on services provided over a terrestrial/satellite/cable/IP network.

A further object of the present invention is to provide a broadcast receiver and a channel information processing method which can stably provide a service that a channel requested by the user provides.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a broadcast receiver comprises: a network interface for transmitting and receiving an Internet Protocol (IP) packet; and a controller for detecting broadcast data included in the IP packet and parsing the detected broadcast data to obtain virtual channel information and physical channel information. Here, the broadcast data may be transmitted based on service discovery & selection (SD&S).

The virtual channel information may include, on a virtual channel basis, at least one of a service source which provides a virtual channel based on an IP network and a service source which provides the virtual channel based on a cable network.

If a plurality of service sources are provided to provide the virtual channel, the controller may select one of the plurality of service sources based on at least one of information about a communication speed of the IP network, service source charge information, content picture quality information provided by the service sources and user preference information.

Alternatively, if a plurality of service sources are provided to provide the virtual channel, the controller may display the plurality of service sources to enable a viewer to select a desired one of the service sources.

The broadcast receiver may further comprise: a tuner for tuning to a broadcast signal received through at least one of a cable and an antenna; a demodulator for demodulating the received broadcast signal; a demultiplexer for demultiplexing the demodulated broadcast signal; and a decoder for decoding the demultiplexed broadcast signal.

In another aspect of the present invention, a channel information processing method comprises: receiving an IP packet including broadcast data; detecting the broadcast data from the IP packet; and obtaining virtual channel information and physical channel information based on the detected broadcast data. Here, the broadcast data may be transmitted based on SD&S.

The virtual channel information may include, on a virtual channel basis, at least one of a service source which provides a virtual channel based on an IP network and a service source which provides the virtual channel based on a cable network.

The channel information processing method may further comprise: displaying a virtual channel included in the virtual channel information and a service source providing the virtual channel included in the virtual channel information; receiving a view request for the displayed service source from a viewer; and receiving the virtual channel provided by the displayed service source.

Alternatively, the channel information processing method may further comprise: receiving a view request for the virtual channel from a viewer; identifying a service source providing the virtual channel based on the virtual channel information; and if a plurality of service sources are provided to provide the virtual channel, selecting one of the plurality of service sources based on at least one of information about a communication speed of the IP network, service source charge information, content picture quality information provided by the service sources and user preference information.

In a further aspect of the present invention, a channel information processing method comprises: obtaining channel information including virtual channel information and physical channel information; and transmitting the obtained channel information based on an IP. Here, the channel information may be transmitted based on SD&S.

The virtual channel information may be transmitted in a broadcast discovery record and the physical channel information may be transmitted in a cable network information record.

The virtual channel information may include, on a virtual channel basis, at least one of a service source which provides a virtual channel based on an IP network and a service source which provides the virtual channel based on a cable network.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a table showing ID values of service discovery & selection (SD&S) records according to the present invention;

FIG. 7 is a view showing an example of the syntax structure of a SVCT which is applied to the present invention;

FIG. 8 is a view showing an example of the syntax structure of a VCM which is applied to the present invention;

FIG. 9 is a view showing an example of the syntax structure of Virtual_channel which is applied to the present invention;

FIGS. 10A and 10B are tables illustrating descriptions of respective elements included in the broadcast discovery record;

FIG. 12 is a view showing an example of the syntax structure of a DCM which is applied to the present invention;

FIG. 13 is a table illustrating descriptions of respective elements included in the DefinedChannelList element;

FIGS. 14A to 14C are views illustrating the broadcast discovery record according to the present invention in an XML schema;

FIG. 16 is a view showing an example of the syntax structure of an NIT which is applied to the present invention;

FIG. 17 is a view showing an example of the syntax structure of CDS_record( ) which is applied to the present invention;

FIG. 18 is a view showing an example of the syntax structure of MMS_record( ) which is applied to the present invention;

FIG. 19 is a table illustrating descriptions of respective elements included in the cable network information record;

FIG. 20 is a table illustrating the types of a transmission system according to the present invention;

FIG. 21 is a table illustrating the types of an inner coding mode according to the present invention;

FIG. 22 is a table illustrating the types of a modulation format according to the present invention;

FIGS. 23A and 23B are views illustrating the cable network information record according to the present invention in the XML schema;

DESCRIPTION OF SPECIFIC EMBODIMENTS

Figure 1:
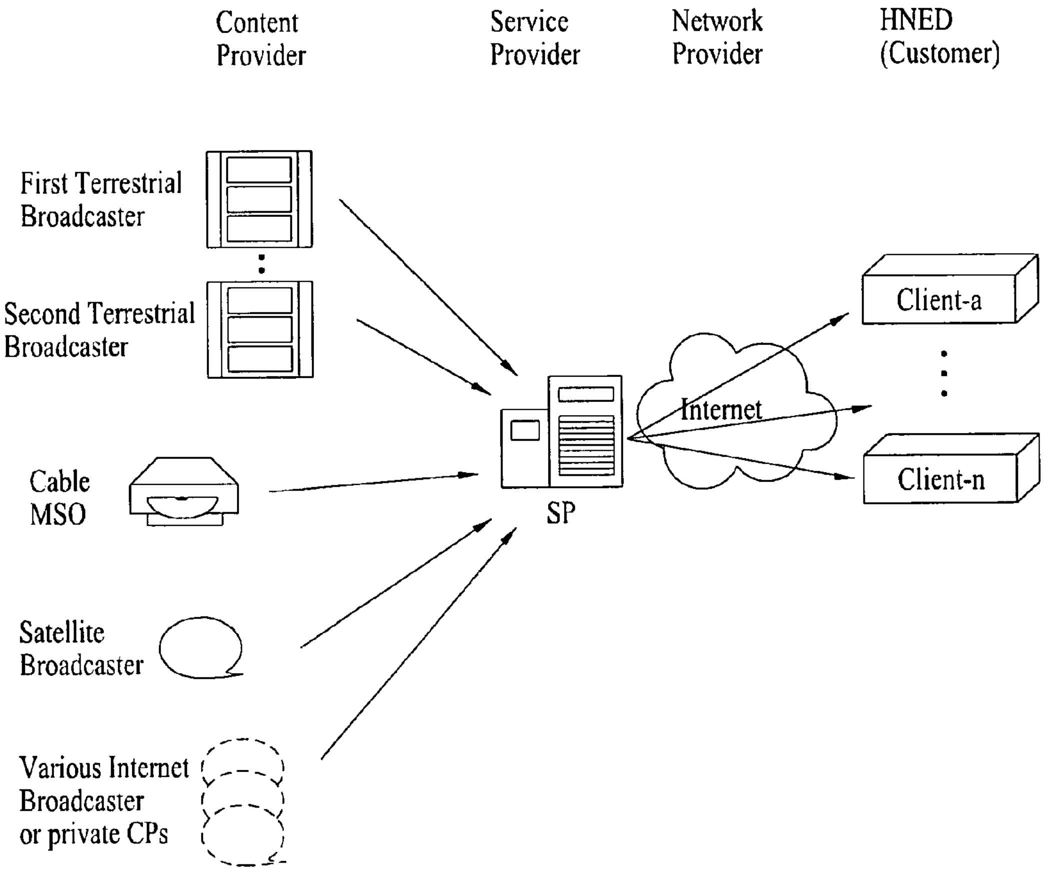
FIG. 1 is a view showing a preferred embodiment of an IPTV system according to the present invention.

Reference will now be made in detail to the preferred embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may make the subject matter of the invention rather unclear.

Although terms used in the present invention are possibly selected from the currently well-known ones, some terms are arbitrarily chosen by the inventor in some cases so that their meanings are explained in detail in the following description. Hence, the present invention should be understood with the intended meanings of the corresponding terms chosen by the inventor instead of the simple names or meanings of the terms themselves.

Hereinafter, a broadcast receiver and a channel information processing method according to the present invention will be described in detail with reference to the annexed drawings.

An Internet Protocol television (IPTV) system, which is an example of a system capable of providing various contents using an Internet network, can be broadly divided into a server, a network, and a receiver (client).

The server of the IPTV system includes servers taking charge of various functions, such as a service discovery & selection information server, a streaming server, a contents guide information server, a customer information server and a payment information server.

The streaming server, among these servers, transmits moving image data encoded in moving picture experts group (MPEG)2, MPEG4 or the like, stored therein, to the user over the network. A real-time transport protocol (RTP), RTP control protocol (RTCP), etc. may be used as protocols for the transmission.

Using a real-time streaming protocol (RTSP), the streaming server may control playback of a moving image stream to some degree through a function called Network Trick Play, including Pause, Replay, Stop, etc.

The contents guide information server is a server that provides information about various contents. The contents guide information corresponds to electronic program guide (EPG) information and includes various information about contents. The contents guide information server stores contents guide information data and provides the stored data to the receiver.

The service discovery & selection information server provides the receiver with connection information, playback information, etc. about servers providing various content services such as broadcasting, Contents On Demand (COD) and games.

The network of the IPTV system includes an Internet-based network, and gateways. The Internet-based network can be implemented based on an IP on various networks including an optical cable network, coaxial cable network, Fiber To The Home (FTTH), telephone network, wireless network, etc. The gateways can perform multicast group management using an Internet group management protocol (IGMP) and other protocols, Quality of Service (QoS) management and so forth, as well as general data transfer.

The receiver of the IPTV system refers to a receiver capable of receiving data transmitted over the Internet network and providing the received data to the user. The receiver may be, for example, an IPTV settop, homenet gateway, or IPTV-embedded TV.

In the case where the IPTV system is of a hybrid type, it can provide various contents of the Internet, as well as various existing broadcast contents. That is, the IPTV system can provide the user with various broadcast contents, such as a terrestrial broadcast, cable broadcast, satellite broadcast and private broadcast, or various Internet image contents and data contents, etc. These contents may be provided in real time or on demand.

FIG. 1 shows a preferred embodiment of an IPTV system according to the present invention.

Referring to FIG. 1, in terms of provision of a content service, the IPTV system can be divided into a content provider (CP), service provider (SP), network provider (NP), and user.

The content provider creates and provides various contents. The content provider may include, as shown in FIG. 1, a terrestrial broadcaster, a cable system operator (SO) or multiple system operator (MSO), a satellite broadcaster, an Internet broadcaster, etc.

The service provider packages the contents provided from the content provider into a service and provides the packaged service. For example, the service provider of FIG. 1 packages a first terrestrial broadcast, a second terrestrial broadcast, a cable MSO broadcast, a satellite broadcast, a variety of Internet broadcasts, etc. into a service and provides the packaged service to the user.

Figure 2A:
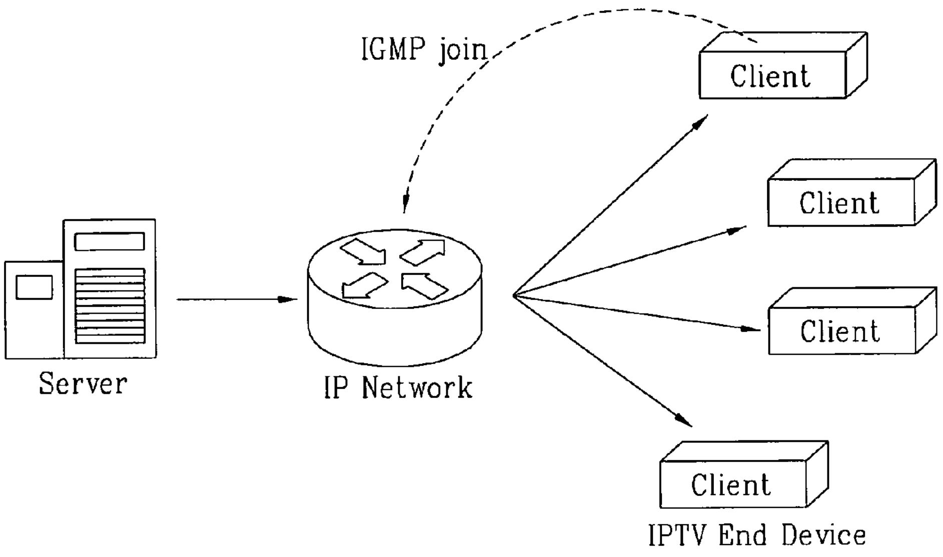
FIGS. 2A and 2B are views schematically illustrating a multicast mode and a unicast mode, respectively.
Figure 2B:
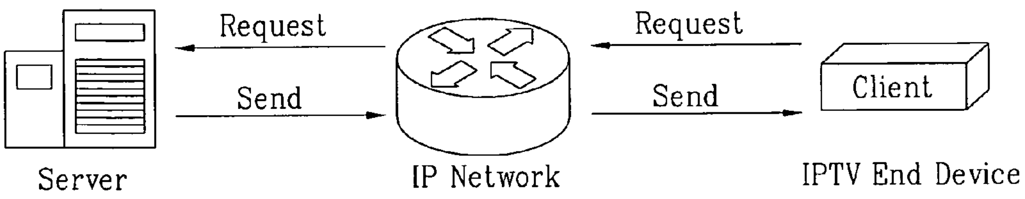

The service provider provides the service to the user using a unicast mode or multicast mode. FIG. 2A and FIG. 2B schematically illustrate the multicast mode and the unicast mode, respectively. The unicast mode is a mode where data is transmitted between one sender and one recipient in a 1:1 manner. For example, in the unicast mode, if a receiver requests data of a server, the server transmits the data to the receiver in response to the request. The multicast mode is a mode where data is transmitted to a specific group of recipients. For example, in the multicast mode, a server can transmit data to a plurality of pre-registered receivers at one time. The Internet group management protocol (IGMP), etc. may be used for the multicast registration.

The network provider provides a network for provision of the aforementioned service to the user. The user may construct a home network end user (HNED) to receive the service.

The above-mentioned IPTV system may employ a conditional access, content protection, etc. as means for protection of a content being transmitted. A CableCARD, downloadable conditional access system (DCAS) or the like may be taken as an example of the conditional access or content protection.

Figure 3:
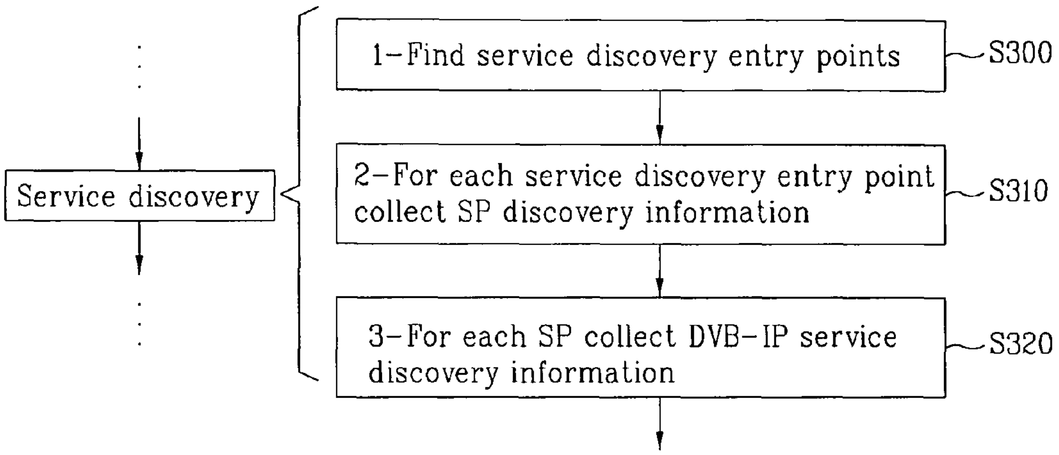
FIG. 3 is a flowchart illustrating a service discovery process.

FIG. 3 is a flowchart illustrating a service discovery process.

Referring to FIG. 3, in order to provide a content to the user, the IPTV receiver has to find and connect to a content server in which a content desired by the user is stored. In order to find the content server, the receiver may connect to an entry point of an IPTV portal (or system operator (SO)) provided by the network provider (S300). The entry point refers to a kind of access point. The user may input either an IP address/port of the entry point of the IPTV portal or a domain name system (DNS) uniform resource locator (URL), or may selectively input a pre-registered address, etc. Otherwise, the receiver may automatically access a pre-selected address, etc.

The entry point of the IPTV portal provides a service provider discovery record including information about each service provider to the receiver (S310). The service provider discovery record includes various information about each service provider, for example, service provider identification information, connection information, etc.

The receiver connects to a server of a service provider providing a service desired by the user, using the information of the received service provider discovery record. The service provider provides a service discovery record including information about a content to the receiver (S320). The service discovery record includes various information about a content service, for example, an access address of a service server having the content stored therein, etc.

The receiver stores the received service discovery record. Then, the receiver connects to a service server of a content provider providing a content desired by the user, using the information of the service discovery record, and receives a stream from the server. Provided that the user intends to watch a content provided from a different channel (or a content provided from a different service server), the receiver reconnects to a service server of a corresponding content provider using the information of the stored service discovery record.

In order to receive a broadcast content over a cable network, the receiver has to receive channel information about the cable network. According to the present invention, the receiver may receive the channel information about the cable network over an IP network. Also, the channel information about the cable network may be transmitted to the receiver based on service discovery & selection.

For example, the receiver may receive virtual channel information and physical channel information as the channel information about the cable network. In order to provide the virtual channel information and physical channel information over the IP network, the present invention provides a broadcast discovery record including the virtual channel information and a cable network information record including the physical channel information. Here, the virtual channel information may be information that is provided in the form of a virtual channel table (VCT) or shortform virtual channel table (SVCT), and the physical channel information may be information that is provided in the form of a network information table (NIT). The broadcast discovery record and the cable network information record may be transmitted based on the service discovery & selection, and the receiver may receive the broadcast discovery record and the cable network information record over the IP network.

FIG. 4 is a table showing ID values of service discovery & selection (SD&S) records according to the present invention.

Referring to FIG. 4, an ID value signifies a reserved value for future extension when it is "Ox00", a service discovery record including service provider (SP) discovery information when "Ox01", and a broadcast discovery record including broadcast discovery information when "Ox02". Here, the broadcast discovery record may include virtual channel information and be named a broadcast offering record.

Also, an ID value signifies a COD discovery record including COD discovery information when it is "Ox03", a record including information about a service provided from a different SP when "Ox04", and a package discovery record including package discovery information when "Ox05".

Also, an ID value signifies a BCG record including BCG discovery information when it is "Ox06", and a cable network information record including cable network information when "Ox07". Here, the cable network information record may include physical channel information.

Also, ID values "Ox08" to "OxEF" are allocated to a reserved area for future extension, and ID values "OxF0" to "OxFF" are allocated to an area that can be privately defined and used by the user.

ID values are contained in a header of a packet, and records indicated respectively by the corresponding ID values are contained in a payload of the packet. One or more service discovery & selection (SD&S) records may be contained in the payload. The receiver can receive a packet including a service discovery & selection (SD&S) record from an SP, parse an ID value contained in a header of the received packet and identify the type of a record contained in a payload of the received packet based on the parsed ID value.

Figure 5:
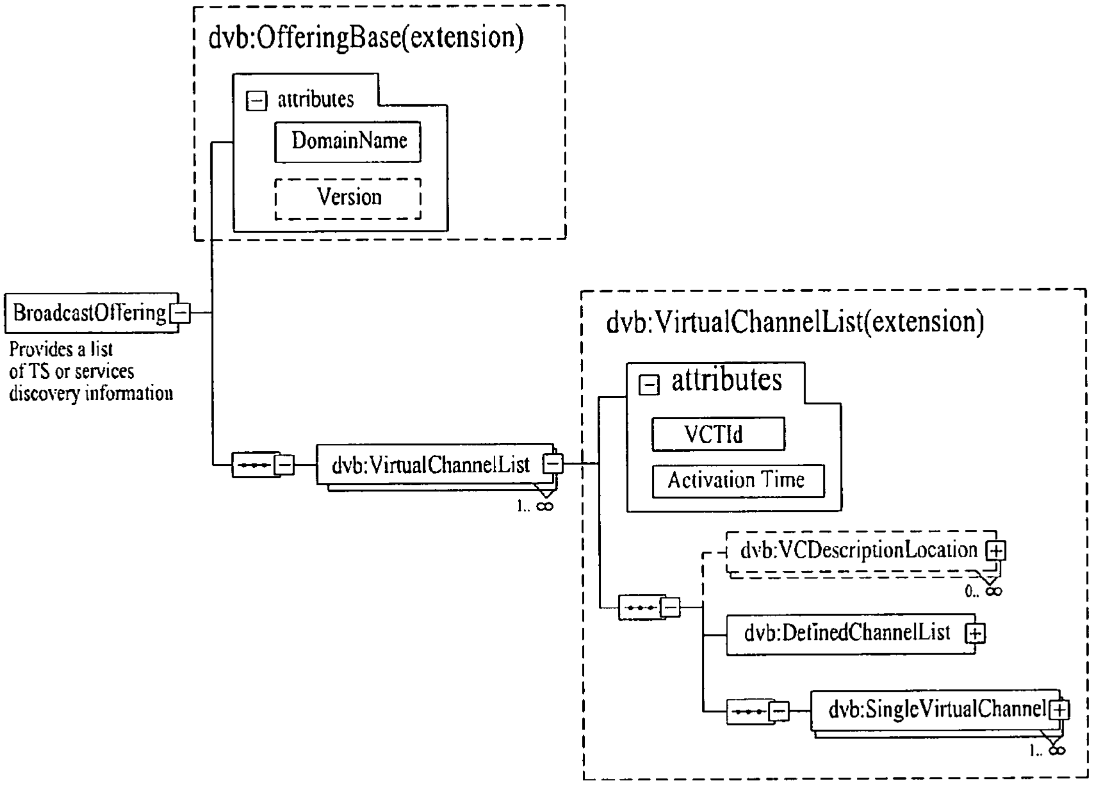
FIG. 5 is a view showing a preferred embodiment of the structure of a broadcast discovery record according to the present invention.

FIG. 5 shows a preferred embodiment of the structure of the broadcast discovery record according to the present invention.

Referring to FIG. 5, the broadcast discovery record is one of service discovery records provided from a service provider, which is a record for transmission of information about a real-time live media broadcast service.

Here, the real-time live media broadcast service can be provided over a terrestrial network, satellite network, cable network or IP network, and the same real-time live media broadcast services may be simultaneously provided over one or more of the terrestrial network, satellite network, cable network and IP network. The broadcast discovery record may include information on a service source that provides the real-time live media broadcast service over the terrestrial network, satellite network, cable network or IP network. Also, the broadcast discovery record may include all information on a plurality of service sources that provide the same real-time live media broadcast services.

The broadcast discovery record is classified into a 'TS-Full SI' type where DVB service information (SI) contained in a transport stream (TS) of an image is used and a 'TS-Optional SI' type where in-band SI except moving picture experts group (MPEG) program specific information (PSI) is not used.

The broadcast discovery record of the 'TS-Full SI' type can be used where existing broadcast data is transmitted over the IP network as it is. In this case, only information required for reception of a TS is provided in the broadcast discovery record and information about each service can be obtained from DVB SI contained in the TS. The broadcast discovery record of the 'TS-Optional SI' type can be used where data except in-band SI is transmitted over the IP network. In this case, SI about each service is included in the broadcast discovery record along with service location information. The broadcast discovery record of the 'TS-Optional SI' type and the broadcast discovery record of the 'TS-Full SI' type are the same, with the exception of whether they include SI.

FIG. 5 schematically shows elements included in the broadcast discovery record together with the structure of the record. Here, elements indicated by solid lines are mandatory and elements indicated by dotted lines are optional. For example, a 'dvb:VCDescriptionLocation' element is optional. Here, 'dvb' added in front of the name of each element is nothing but one example and may be replaced by 'atsc' or 'ttl' Here, 'atsc' signifies Advanced Television Systems Committee and 'ttl' signifies Telecommunications Technology Committee.

The broadcast discovery record includes a 'DomainName' attribute, a 'Version' attribute, and a 'VirtualChannelList' element. The 'VirtualChannelList' element includes a 'VCTId' attribute, an 'ActivationTime' attribute, a 'VCDescriptionLocation' element, a 'DefinedChannelList' element, and a 'SingleVirtualChannel' element. Here, the 'SingleVirtualChannel' element is of a 'VirtualChannel' element type.

Figure 6:
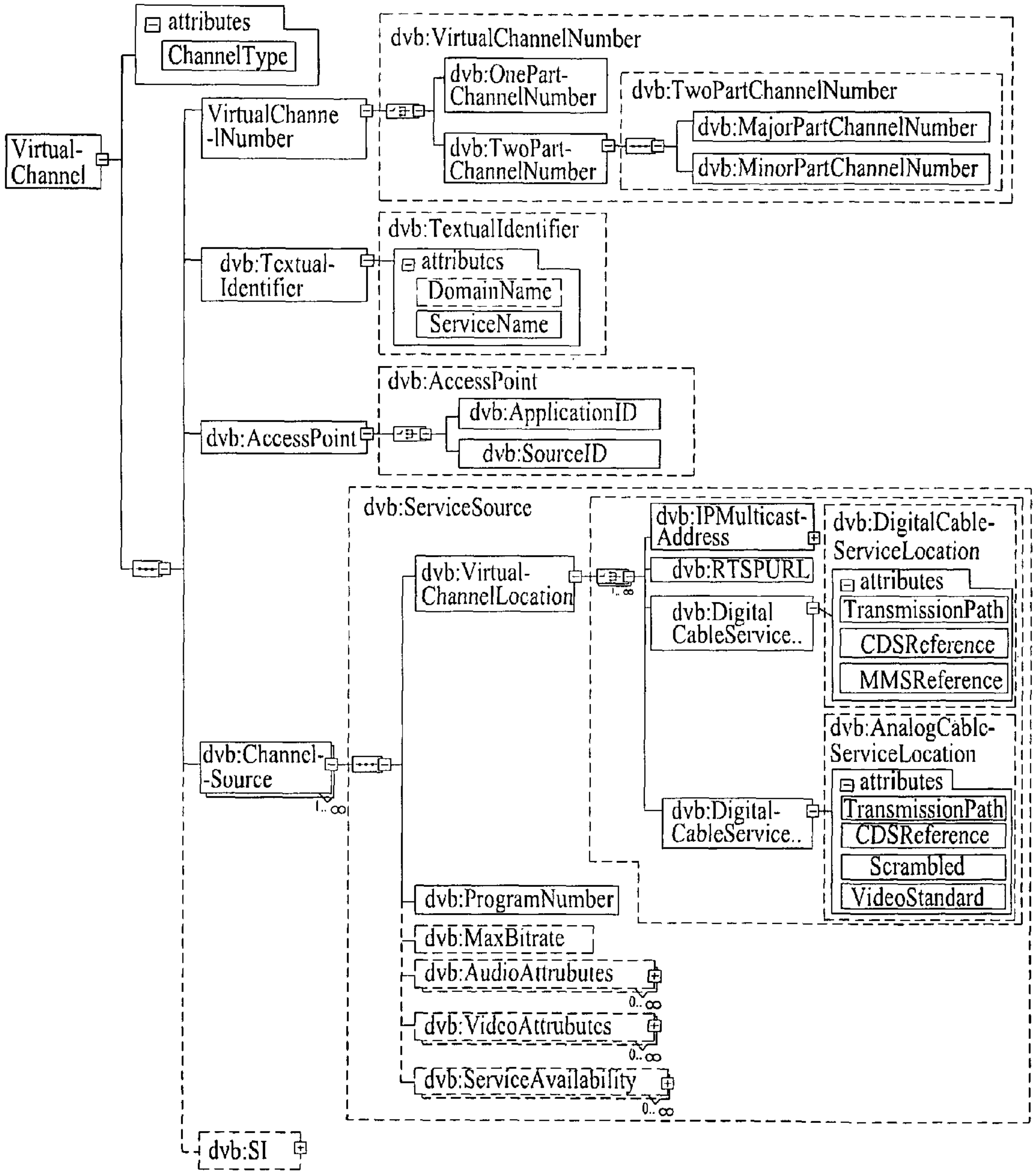
FIG. 6 is a view showing a preferred embodiment of the structure of a virtual channel element according to the present invention.

FIG. 6 shows a preferred embodiment of the structure of a virtual channel element according to the present invention.

Referring to FIG. 6, the 'VirtualChannel' element includes a 'ChannelType' attribute, a 'VirtualChannelNumber' element, a 'TextualIdentifier' element, an 'AccessPoint' element, a 'ChannelSource' element, and an 'SI' element. The 'VirtualChannelNumber' element selectively includes any one of a 'OnePartChannelNumber' element and a 'TwoPartChannelNumber' element. Here, the 'OnePartChannelNumber' element signifies a one-part channel and the 'TwoPartChannelNumber' element signifies a two-part channel. The 'TwoPartChannelNumber' element includes a 'MajorPartChannelNumber' element including physical channel information, and a 'MinorPartChannelNumber' element including logical channel information.

The 'TextualIdentifier' element includes a 'DomainName' attribute and a 'ServiceName' element, and the 'AccessPoint' element includes an 'ApplicationID' element and a 'SourceID' element.

The 'ChannelSource' element includes a 'VirtualChannelLocation' element, a 'ProgramNumber' element, a 'MaxBitrate' element, an 'AudioAttributes' element, a 'VideoAttributes' element, and a 'ServiceAvailability' element.

FIG. 7 shows an example of the syntax structure of a SVCT which is applied to the present invention, FIG. 8 shows an example of the syntax structure of a VCM which is applied to the present invention, and FIG. 9 shows an example of the syntax structure of Virtual_channel which is applied to the present invention.

Referring to FIGS. 7 to 9, the virtual channel information includes information defined in shortform_virtual_channel_table_section (SVCT). That is, the virtual channel information includes information stored in each field included in the SVCT. The SVCT includes a 'table_ID' field, a 'section_length' field, a 'protocol_version' field, a 'transmission_medium' field, a 'table_subtype' field, and a 'VCT_ID' field. The SVCT also includes any one of a field indicating DCM_structure (which is a sub-table, a field indicating VCM_structure( ) which is a sub-table, and a field indicating ICM_structure( ) which is a sub-table, based on a value contained in the 'table_subtype' field. Also, the SVCT includes N fields indicating descriptor( ) which is a sub-table.

The VCM_structure( ) includes a 'descriptors_included' field, a 'splice' field, an 'activation_time' field, a 'number_of_VC_records' field, and fields indicating virtual_channel( ) which is a sub-table. Here, the number of the virtual_channel( ) indicating fields is the same as the value of the 'number_of_VC_records' field.

The virtual_channel( ) includes a 'virtual_channel_number' field, an 'application_virtual_channel' field, a 'path_select' field, and a 'transport_type' field. Also, the virtual_channel( ) selectively includes an 'application_ID' field or 'source_ID' field based on the value of the 'application_virtual_channel' field. Also, in the case where the value of the 'transport_type' field is MPEG_2, the virtual_channel( ) includes a 'CDS_reference' field, a 'program_number' field, and an 'MMS_reference' field, or else the virtual_channel( ) includes a 'CDS_reference' field, a 'scrambled' field, a 'zero' field, a 'video_standard' field, and a 'zero' field. Also, the virtual_channel( ) includes fields indicating descriptors which is a sub-table, based on the number of descriptors included.

FIGS. 10A and 10B are tables illustrating descriptions of respective elements included in the broadcast discovery record.

Referring to FIGS. 10A and 10B, the 'VCTId' attribute of the broadcast discovery record is an attribute including information corresponding to the value of the 'VCT_ID' field included in the SVCT, and includes a virtual channel ID indicating a virtual channel. The 'ActivationTime' attribute of the broadcast discovery record is an attribute including information corresponding to the value of the 'activation_time' field included in the VCM_structure( ), and includes information about an absolute second for which virtual channel data transmitted from a table section is available. The 'VCDescriptionLocation' element of the broadcast discovery record includes a BCG record identification value.

The broadcast discovery record has a plurality of 'SingleVirtualChannel' elements, each of which is of a 'VirtualChannel' element type. Here, the 'VirtualChannel' element is an element including information corresponding to the virtual_channel( ).

The 'ChannelType' attribute of the 'VirtualChannel' element is an attribute including information corresponding to the value of the 'channel_type' field of the virtual_channel( ), and includes information defining the type of a virtual channel.

The 'VirtualChannelNumber' element is an element including information corresponding to the value of the 'virtual_channel_number' field of the virtual_channel( ), and includes the number of virtual channels.

The 'TextualIdentifier' element includes a 'DomainName' attribute and a 'ServiceName' element. The 'DomainName' attribute includes DNS name information registered by an SP for identification of the SP, and the 'ServiceName' element includes unique host name information for a service in the domain of the SP.

The 'AccessPoint' element includes an 'ApplicationID' element and a 'SourceID' element. The 'ApplicationID' element and the 'SourceID' element are elements including information corresponding respectively to the values of the 'Application_ID' field and 'Source_ID' field of the virtual_channel( ), and are used for identification of an access point defined by a virtual channel.

The 'VirtualChannelLocation' element of the 'ChannelSource' element is an element including information associated with a service source, and includes an 'IPMulticastAddress' element, an 'RTSPURL' element, a 'DigitalCableService' element, and an 'AnalogCableService' element.

The 'IPMulticastAddress' element requests reception based on the Internet group management protocol (IGMP) to access a virtual channel, and includes multicast address information for the access to the virtual channel.

The 'RTSPURL' element declares reception based on the real-time streaming protocol (RTSP) to access a virtual channel, and includes uniform resource locator (URL) information for the access to the virtual channel.

The 'DigitalCableService' element declares use of a digital cable network to access a virtual channel, and includes frequency and modulation information for the access to the virtual channel. To this end, the 'DigitalCableService' element includes a 'TransmissionPath' element, a 'CDSReference' element, and an 'MMSReference' element. Here, the 'CDSReference' element is an element including information corresponding to the value of the 'CDS_reference' field of the virtual_channel( ), and includes information about the frequency of a physical channel associated with the virtual channel. The 'MMSReference' element is an element including information corresponding to the value of the 'MMS_reference' field of the virtual_channel( ), and includes information indicating a modulation mode.

The 'AnalogCableService' element declares use of an analog cable network to access a virtual channel, and includes frequency information for the access to the virtual channel.

To this end, the 'AnalogCableService' element includes a 'TransmissionPath' element, a 'CDSReference' element, a 'Scrambled', element, and a 'VideoStandard' element. Here, the 'CDSReference' element is an element including information corresponding to the value of the 'CDS_reference' field of the virtual_channel( ), and includes information about the frequency of a physical channel associated with the virtual channel. The 'Scrambled' element is an element including information corresponding to the value of the 'Scrambled' field of the virtual_channel( ), and includes information associated with scrambling. The 'VideoStandard' element is an element including information corresponding to the value of the 'video_standard' field of the virtual_channel( ), and includes information indicating a video standard associated with a non-standard virtual channel.

The 'ProgramNumber' element is an element including information corresponding to the value of the 'program_number' field of the virtual_channel( ), and includes information associating a virtual channel with a service that the virtual channel provides.

The 'MaxBitrate' element includes information specifying the maximum bitrate of an overall stream carrying a preview service, the 'AudioAttributes' element includes information on audio coding algorithms, and the 'VideoAttributes' element includes information on video coding algorithms. The 'ServiceAvailability' element includes information for region distinction.

Figure 11:
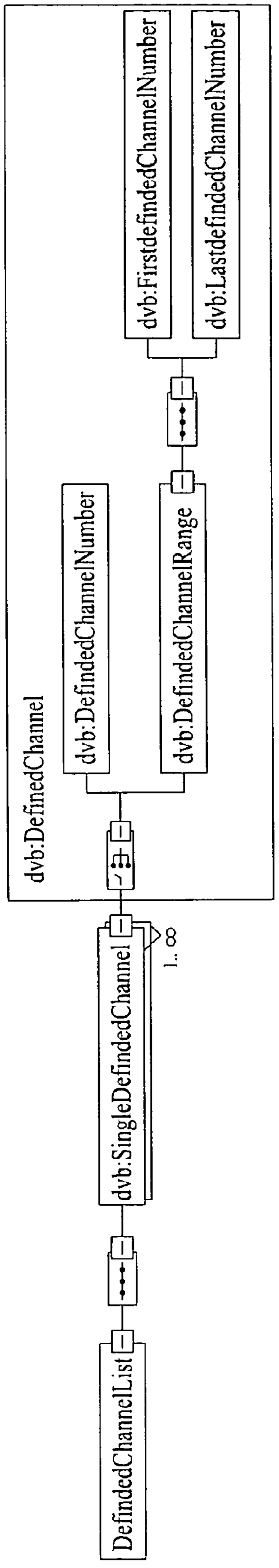
FIG. 11 is a view showing a preferred embodiment of the structure of a DefinedChannelList element according to the present invention.

FIG. 11 shows a preferred embodiment of the structure of the DefinedChannelList element according to the present invention.

Referring to FIG. 11, the 'DefinedChannelList' element includes at least one 'SingleDefinedChannel' element, which includes a 'DefinedChannelNumber' element and a 'DefinedChannelRange' element.

FIG. 12 shows an example of the syntax structure of a DCM which is applied to the present invention.

Referring to FIG. 12, the DCM_structure( ) includes a 'first_virtual_channel' field and a 'DCM_data_length' field. The DCM_structure( ) also includes 'range_defined' fields and 'channels_count' fields, each of the numbers of which is the same as the value of the 'DCM_data_length' field.

FIG. 13 is a table illustrating descriptions of the respective elements included in the DefinedChannelList element.

Referring to FIG. 13, the 'DefinedChannelNumber' element of the 'DefinedChannelList' element includes information specifying a defined virtual channel. The 'DefinedChannelRange' element includes information specifying a defined virtual channel range. To this end, the 'DefinedChannel-Range' element includes a 'FirstDefinedChannelNumber' element and a 'LastDefinedChannelNumber' element. The 'DefinedChannelRange' element is an element including information corresponding to the value of the 'first_virtual_channel' field of the DCM_structure( ), and includes information specifying a first virtual channel number of the defined range. The LastDefinedChannelNumber element is an element including information corresponding to a value obtained by adding the value of the 'DCM_data_length' field to the value of the 'first_virtual_channel' field of the DCM_structure( ), and includes information specifying a last virtual channel number of the defined range.

FIGS. 14A to 14C illustrate the broadcast discovery record according to the present invention in an XML schema.

Referring to FIGS. 14A to 14C, the broadcast discovery record is defined as complexType, and has a complexType name called BroadcastOffering. The BroadcastOffering includes at least one VirtualChannelList as an element. The VirtualChannelList element is also defined as the complexType, and includes a 'VCDescriptionLocation' element, a 'DefinedChannelList', element, and a 'SingleVirtualChannel' element. Also, the VirtualChannelList element includes a 'VCTId' attribute and an 'ActivationTime' attribute. Here, the 'SingleVirtualChannel' element is of a 'VirtualChannel' element type.

Figure 15:
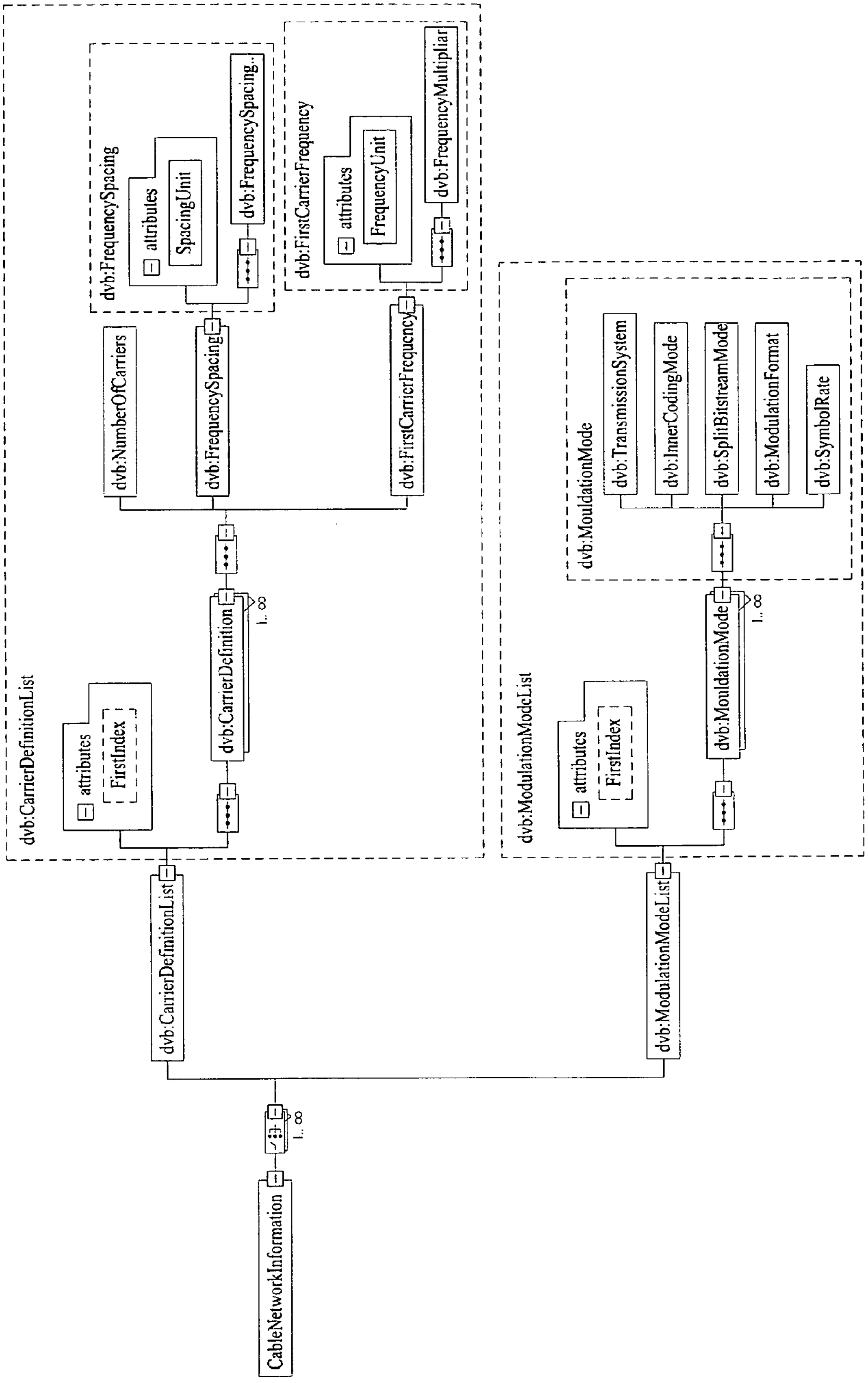
FIG. 15 is a view showing a preferred embodiment of the structure of a cable network information record according to the present invention.

FIG. 15 shows a preferred embodiment of the structure of the cable network information record according to the present invention.

Referring to FIG. 15, the cable network information record includes a 'CarrierDefinitionList' element and a 'ModulationModeList' element. The 'CarrierDefinitionList' element includes a 'FirstIndex' attribute and a 'CarrierDefinition' element. The 'CarrierDefinition' element includes a 'NumberOfCarriers' element, a 'FrequencySpacing' element, and a 'FirstCarrierFrequency' element.

The 'ModulationModeList' element includes a 'FirstIndex' attribute and a 'ModulationMode' element. The 'ModulationMode' element includes a 'TransmissionSystem' element, an 'InnerCodingMode' element, a 'SplitBitstreamMode' element, a 'ModulationFormat' element, and a 'SymbolRate' element.

FIG. 16 shows an example of the syntax structure of an NIT which is applied to the present invention.

Referring to FIG. 16, the physical channel information includes information defined in network_info_table_section (NIT). That is, the physical channel information includes information stored in each field included in the NIT. The NIT includes a 'table_ID' field, a 'section_length' field, a 'protocol_version' field, a 'first_index' field, a 'number_of_records' field, and a 'table_subtype' field. Also, the network_info_table_section (NIT) selectively includes a field indicating CDS_record( ) which is a sub-table or a field indicating MMS_record( ) which is a sub-table, based on the value of the 'table_subtype' field. Together with the CDS_record( ) indicating field or MMS_record( ) indicating field, the NIT also includes fields indicating descriptor( ) which is a sub-table, the number of which is the same as that of descriptors. The NIT also includes a plurality of CDS_record( ) indicating fields or MMS_record( ) indicating fields, the number of which is the same as the value of the 'number_of_records' field. Also, the NIT includes N fields indicating descriptor( ) which is a sub-table.

FIG. 17 shows an example of the syntax structure of CDS_record( ) which is applied to the present invention.

Referring to FIG. 17, the CDS_record( ) includes a 'number_of_carriers' field, a 'spacing_unit' field, a 'frequency_spacing' field, a 'frequency_unit' field, and a 'first_carrier_frequency' field.

FIG. 18 shows an example of the syntax structure of MMS_record( ) which is applied to the present invention.

Referring to FIG. 18, the MMS_record( ) includes a 'transmission_system' field, an 'inner_coding_mode' field, a 'split_ bitstream_mode' field, a 'modulation_format' field, and a 'symbol_rate' field.

FIG. 19 is a table illustrating descriptions of the respective elements included in the cable network information record.

Referring to FIG. 19, the 'CarrierDefinitionList' element includes a 'CarrierDefinition' element as an element including information corresponding to the CDS_record( ) . Here, the 'CarrierDefinition' element includes a 'NumberOfCarriers' element, a 'FrequencySpacing' element, and a 'FirstCarrierFrequency' element. The 'NumberOfCarriers' element is an element including information corresponding to the value of the 'number_of_carriers' field of the CDS_record( ), and includes information representing the number of carriers having defined frequencies. Also, the 'FrequencySpacing' element is an element including information corresponding to the value of the 'frequency_spacing' field of the CDS_record( ), and includes information identifying a unit for frequency spacing. The 'FirstCarrierFrequency' element is an element including information corresponding to the value of the 'first_ carrier_frequency' field of the CDS_record( ), and includes information defining a starting carrier frequency for carriers defined in a group.

The 'ModulationModeList' element includes a 'ModulationMode' element as an element including information corresponding to the MMS_record( ). Here, the 'ModulationMode' element includes a 'TransmissionSystem' element, an 'InnerCodingMode' element, a 'SplitBitstreamMode' element, a 'ModulationFormat' element, and a 'SymbolRate' element. The 'TransmissionSystem' element is an element including information corresponding to the value of the 'transmission_system' field of the MMS_record( ) , and includes information identifying a transmission standard applied for a waveform defined by the MMS_record( ). Also, the 'InnerCodingMode' element is an element including information corresponding to the value of the 'inner_coding_mode' field of the MMS_record( ), and includes information indicating a coding mode for an inner code associated with the aforementioned waveform. Also, the 'SplitBitstreamMode' element is an element including information corresponding to the value of the 'split_bitstream_mode' field of the MMS_record( ), and includes logical information "Yes" or "No". Also, the 'ModulationFormat' element is an element including information corresponding to the value of the 'modulation_format' field of the MMS_record( ), and includes information defining a basic modulation format for a carrier. The 'SymbolRate' element is an element including information corresponding to the value of the 'symbol_rate' field of the MMS_record( ), and includes information indicating a symbol rate for symbols per second associated with the aforementioned waveform.

FIG. 20 is a table illustrating the types of a transmission system according to the present invention.

Referring to FIG. 20, the 'TransmissionSystem' element indicates an unknown transmission system when it has a value 0, and a transmission system conforming to an ITU North American standard specified in ITU when a value 1. Also, in the case where the 'TransmissionSystem' element has a value 3, it means that it is defined for use in other systems. Also, in the case where the 'TransmissionSystem' element has a value 4, it indicates a transmission system conforming to an ATSC digital television standard. Values 5 to 15 of the 'TransmissionSystem' element are defined as reserved values for future use of the 'TransmissionSystem' element.

FIG. 21 is a table illustrating the types of an inner coding mode according to the present invention.

Referring to FIG. 21, the 'InnerCodingMode' element includes a value of 0 to 15. The 'InnerCodingMode' element indicates a rate 5/11, 1/2, 3/5, 2/3, 3/4, 4/5, 5/6or 7/8 coding mode according to the value included therein. For example, in the case where the 'InnerCodingMode' element is 0, it indicates a coding mode whose rate is 5/11. Also, in the case where the 'InnerCodingMode' element is 1, it indicates a coding mode whose rate is 1/2. The values 12 to 14 of the 'InnerCodingMode' element are defined as reserved values for future use of the 'InnerCodingMode' element.

FIG. 22 is a table illustrating the types of a modulation format according to the present invention.

Referring to FIG. 22, the 'ModulationFormat' element includes a value of 0 to 31. The 'ModulationFormat' element indicates an unknown modulation format or a modulation format such as QPSK, BPSK, OQPSK, VSB8, VSB16 or QAM according to the value included therein. For example, in the case where the 'ModulationFormat' element is 16, it indicates a QAM 256-256_level QAM modulation format.

FIGS. 23A and 23B illustrate the cable network information record according to the present invention in the XML schema.

Referring to FIGS. 23A and 23B, the cable network information record is defined as complexType, and has a complexType name called CableNetworkInformation. The CableNetworkInformation includes a 'CarrierDefinitionList' element and a 'ModulationModeList' element defined as the complexType, as elements.

Figure 24:
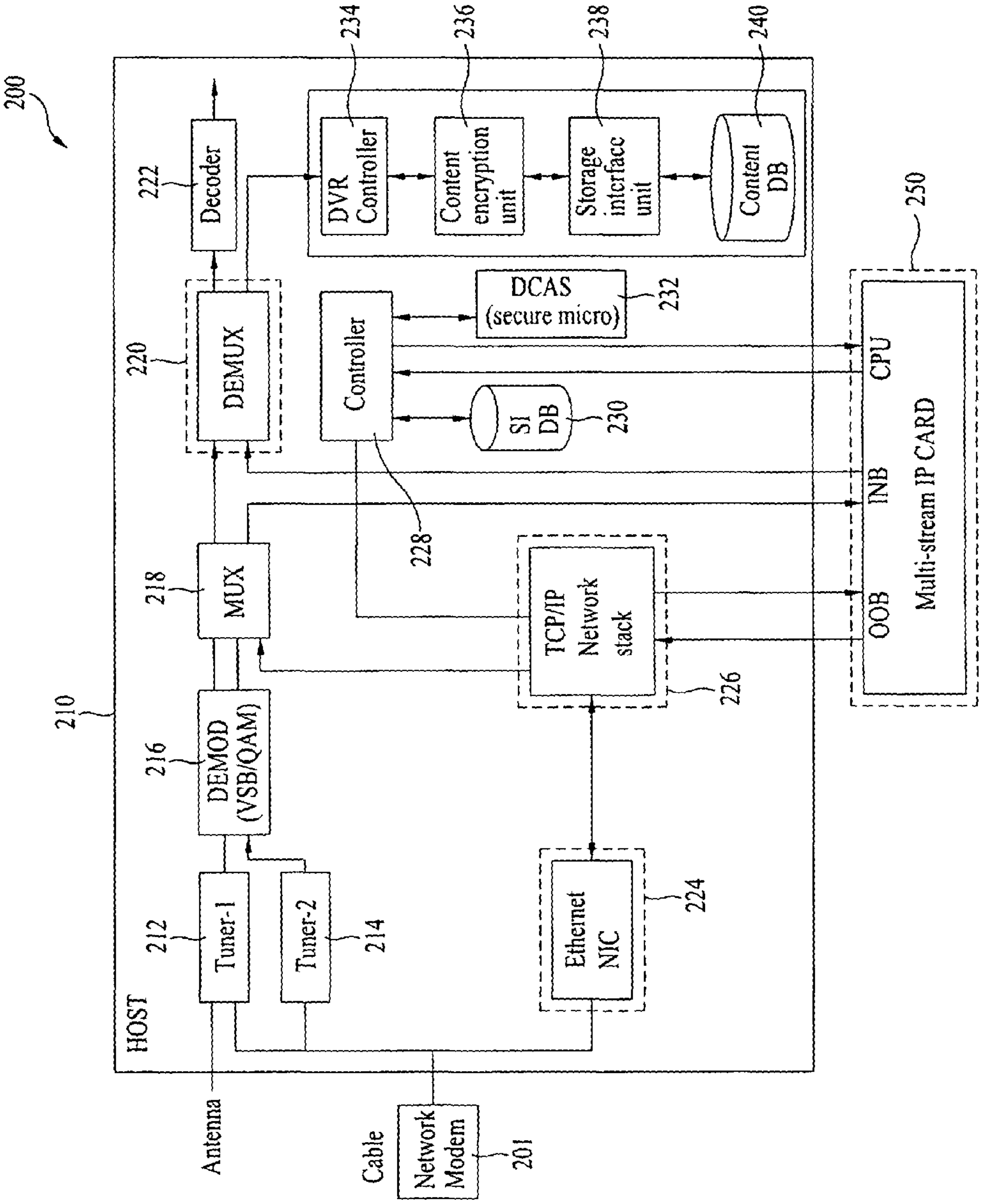
FIG. 24 is a block diagram showing the configuration of a preferred embodiment of a broadcast receiver according to the present invention.

FIG. 24 is a block diagram showing the configuration of a preferred embodiment of a broadcast receiver according to the present invention.

Referring to FIG. 24, the broadcast receiver, denoted by reference numeral 200, refers to a broadcast receiver of a type capable of receiving all an IP-based IPTV service, a cable broadcast, a terrestrial broadcast, a satellite broadcast, etc. The broadcast receiver 200 may be implemented to receive only the IPTV or receive only the cable broadcast according to different embodiments. Also, a cable card 250 mounted in the broadcast receiver may be called different names according to the different embodiments.

The broadcast receiver 200 comprises a host device 210 and a cable card 250. The host device 210 includes a tuner-1 212, tuner-2 214, demodulator 216, multiplexer 218, demultiplexer 220, decoder 222, Ethernet network interface card (NIC) 224, TCP/IP network stack 226, controller 228, system information (SI) database 230, downloadable CAS (DCAS) 232, digital video recorder (DVR) controller 234, content encryption unit 236, storage interface unit 238, and content database 240. The cable card 250 may be a single stream card capable of processing only one stream or a multi-stream card capable of simultaneously processing a plurality of streams.

The broadcast receiver 200 may be of an open cable type where a cable card including a conditional access (CA) system is separated from the body of the receiver. Also, the cable card 250 may be called a Point Of Deployment (POD) module and may be detachably mounted in a slot of the body of the broadcast receiver 200. The body into which the cable card 250 is inserted may be called a host device. That is, a combination of the cable card 250 and the host device 210 is referred to as the broadcast receiver 200.

A network modem 201 functions to connect the broadcast receiver 200 with an external network. For example, the network modem 201 may connect the broadcast receiver 200 with an external IP network. For example, in the case where a Multimedia over Coax Alliance (MOCA) is used as the network modem 201, an IP-based network may be constructed on a coaxial cable network and connected with the broadcast receiver 200. Alternatively, the broadcast receiver 200 may be connected with an external network using a DOCSIS modem. As another alternative, the broadcast receiver 200 may be connected with an external network using a wireless repeater connected with a wireless Internet network or a wired repeater connected with a wired Internet network, such as a wired ADSL repeater. The aforementioned examples of connection of the broadcast receiver 200 with the external network are nothing but embodiments, and any one thereof can be selected according to how to connect the broadcast receiver 200 with the external network.

The tuner-1 212 tunes to only an audio/video (A/V) broadcast of a specific channel frequency among terrestrial A/V broadcasts transmitted through an antenna or cable A/V broadcasts transmitted in-band through a cable connected with the network modem 201 and outputs the tuned A/V broadcast to the demodulator 216.

The demodulator 216 demodulates a terrestrial broadcast and a cable broadcast in different manners because the terrestrial broadcast and the cable broadcast are transmitted in different manners. For example, a terrestrial A/V broadcast is modulated and transmitted in a vestigial sideband modulation (VSB) manner and a cable A/V broadcast is modulated and transmitted in a quadrature amplitude modulation (QAM) manner. Therefore, the demodulator 216 demodulates the A/V broadcast of the channel frequency tuned by the tuner-1 212 in the VSB manner when it is a terrestrial broadcast, and in the QAM manner when it is a cable broadcast.

The tuner-2 214 tunes to only an A/V broadcast of a specific channel frequency among the cable A/V broadcasts transmitted in-band through the cable connected with the network modem 201 and outputs the tuned A/V broadcast to the demodulator 216.

The tuner-1 212 and the tuner-2 214 may tune to signals of different channels and send the tuned signals to the demodulator 216. Alternatively, the tuner-1 212 and the tuner-2 214 may tune to different A/V streams of the same channel and send the tuned streams to the demodulator 216. For example, the tuner-1 212 may tune to a stream of a main picture and the tuner-2 214 may tune to a Picture in Picture (PIP) stream. Also, in the case where a digital video signal is stored using a digital video recorder or the like, the user may record the video signal at the same time as watching an image, by using the tuner-1 212 and tuner-2 214.

The demodulator 216 demodulates a received signal and sends the demodulated signal to the multiplexer 218. The multiplexer 218 multiplexes and outputs signals inputted from the demodulator 216 and the TCP/IP network stack 226. For example, the multiplexer 218 may multiplex and output a main image demodulated after being tuned by the tuner-1 212 and a PIP image demodulated after being tuned by the tuner-2 214. Alternatively, according to different embodiments, the multiplexer 218 may multiplex images of different channels or multiplex and output them with an output signal from the TCP/IP network stack 226.

The multiplexer 218 outputs an input signal directly to the demultiplexer 220 when the input signal is a terrestrial broadcast signal, and to the demultiplexer 220 through the cable card 250 mounted in the slot when the input signal is a cable broadcast signal or IPTV broadcast signal. The cable card 250 includes a conditional access (CA) system for copy prevention and conditional access for high value-added broadcast contents, and is also called a Point Of Deployment (POD) module.

That is, if a received broadcast signal was scrambled, the cable card 250 descrambles the received broadcast signal and outputs the descrambled broadcast signal to the demultiplexer 220. Provided that the cable card 250 is not mounted, the A/V broadcast signal outputted from the multiplexer 218 is directly outputted to the demultiplexer 220. In this case, the user cannot normally watch a scrambled A/V broadcast signal, because the scrambled A/V broadcast signal cannot be descrambled.

The demultiplexer 220 separates a video signal and an audio signal inputted thereto from each other and outputs the separated video signal and audio signal to the decoder 222. The decoder 222 restores compressed A/V signals to original signals through a video decoding algorithm and an audio decoding algorithm, respectively, and outputs the restored signals for display and sound output thereof.

The DVR controller 234, content encryption unit 236, storage interface unit 238 and content database 240 function to store received digital data or reproduce stored data. The DVR controller 234 controls a DVR under control of the controller 228 to store selected video data, etc. among output data from the demultiplexer 220 or reproduce selected video data, etc. among stored data. The content encryption unit 236 encrypts and outputs data to be stored or decrypts and outputs data encrypted and stored. The content encryption unit 236 may not be used according to a different embodiment.

The storage interface unit 238 performs data input/output interfacing with the content database 240, and the content database 240 stores data inputted thereto.

The DCAS 232 downloads and stores conditional access systems (CASs) from a transmitting server and performs a conditional access function according to a proper one of the stored conditional access systems.

The Ethernet NIC 224 receives an Ethernet frame packet to be transmitted to a specific IP address, among signals received through the network modem 201, and sends the received packet to the TCP/IP network stack 226. Alternatively, the Ethernet NIC 224 receives data based on bidirectional communication (for example, pay program application, receiver status information, user input, etc.) from the TCP/IP network stack 226 and transmits the received data to the external network through the network modem 201. The above specific IP address may be a self IP address of the host device or an IP address of the cable card. Also, the Ethernet NIC 224 receives channel information to be transmitted to an IP network through the network modem 201. Here, the channel information includes channel information on a terrestrial/satellite/cable broadcast, as well as an IP broadcast, as stated previously. Also, the channel information includes virtual channel information and physical channel information, as stated previously.

The broadcast receiver 200 can receive an IP-based IPTV broadcast signal, a Video On Demand (VOD) signal, an Out Of Band (OOB) message signal and a channel information signal through the Ethernet NIC 224. In existing cable broadcasting, the broadcast receiver 200 can receive OOB messages such as System Information (SI), Emergency Alert System (EAS), extended Application Information Table (XAIT), conditional access system information and various cable card control information using a DOCSIS Settop Gateway (DSG) system or Out Of Band (OOB) system. Also, the broadcast receiver 200 can receive channel information transmitted over an IP network based on an SD&S protocol.

In the broadcast receiver 200, the host device may comprise a DOCSIS modem, an OOB tuner, etc. to receive the OOB messages. For example, the broadcast receiver 200 may receive the OOB messages using one of the IP system and OOB system or one of the IP system, DSG system and OOB system.

In the case of receiving the OOB messages using one of the IP system and OOB system, the broadcast receiver 200 may further comprise an OOB modem, a demodulator, etc. Also, in the case of receiving the OOB messages using one of the IP system, DSG system and OOB system, the broadcast receiver 200 may further comprise a DOCSIS modem, an OOB modem, a switch for selecting the DSG system and OOB system, a demodulator for transmitting data to a headend according to the respective systems, and so forth.

In the case where the IP system and both of the existing DSG system and OOB system can be used or in the case where the IP system and the OOB system, with the exception of the DSG system, can be used, as stated above, a transmitter can determine which system will be used and transmit information about the determination to the cable card. The cable card 250 informs the host device 210 of an operating system based on the determination information from the transmitter. In this case, it is also possible to solve a backward compatibility problem.

For the convenience of description of the broadcast receiver 200, a description will be mainly given of the case of receiving an OOB message, etc. through the Ethernet NIC 224 using the IP system, not the DSG system using the DOCSIS modem or the OOB system using the OOB tuner. In this case, the transmitter has to packetize and transmit the OOB message, etc. using the IP system. In a case such as VOD or IPTV broadcasting, a message such as conditional access system information, and so forth can be received in the form of a packet such as a VOD packet or IPTV broadcast packet.

The exampled OOB message is nothing but one example. According to different embodiments, necessary information other than the exampled information may be added to the OOB message or unnecessary information among the exampled information may be excluded.

The TCP/IP network stack 226 routes a received packet to a destination of the packet using a TCP/IP protocol-based network stack. The TCP/IP network stack 226 supports both the TCP/IP protocol and user datagram protocol (UDP)/IP protocol.

The TCP/IP network stack 226 routes a received VOD signal or IPTV broadcast signal to the multiplexer 218. The multiplexer 218 parses a received moving picture experts group (MPEG)-based TP packet, and multiplexes and outputs the parsed TP packet to the demultiplexer 220 as stated previously. In the above example, a TP packet is received and parsed because it was assumed that an MPEG-based broadcast signal is received. However, in the case where a broadcast signal based on a different standard is received, a different unit, not the TP packet unit, may be used. Therefore, it will be understood that the spirit of the present invention is not limited to terms used in embodiments.

The TCP/IP network stack 226 sends packets whose destination is the cable card 250 to the cable card 250. An Out Of Band (OOB) message, which is one of the packets whose destination is the cable card 250, is routed and sent to the cable card 250 by the TCP/IP network stack 226. Also, the TCP/IP network stack 226 routes channel information received by the Ethernet NIC 224 to the controller 228. In the case of routing the OOB message and channel information respectively to the cable card 250 and controller 228, data can be sent to the cable card 250 and controller 228 through layer-2 routing or layer-3 routing.

In the case where the layer-2 routing is used, this routing is performed using a media access control (MAC) address system of a destination contained in a header of a received Ethernet frame. In the case where the layer-3 routing is used, this routing is performed using an IP address system of a destination contained in an IP header of a received Ethernet frame. Which one of the layer-2 routing and layer-3 routing will be used can be differently determined according to different embodiments. That is, according to the different embodiments, the layer-2 routing system may be used and the layer-3 routing system may be used.

The controller 228 controls interfacing between the host device and the cable card, data processing of the host device, and so forth. The controller 228 receives and processes channel information routed by the TCP/IP network stack 226. Here, the channel information is included in the above-stated broadcast offering record and cable network information record. The controller 228 parses the broadcast offering record and cable network information record, configures information in the form of an electronic program guide (EPG) and provides the configured information to the user. Also, the controller 228 stores the received channel information and information created based on the received channel information in the system information (SI) database 230.

In the case where a specific channel is selected by the user, the controller 228 identifies a corresponding one of 'virtual-channel' elements included in a broadcast offering record of the channel selected by the user, finds a 'VirtualChannelLocation' element included in the identified 'virtualchannel' element, and receives a service provided over the channel selected by the user based on information included in the 'VirtualChannelLocation' element.

In the case where the 'VirtualChannelLocation' element includes at least two of an 'IPMulticastAddress' element, 'RTSPURL' element, 'DigitalCableService' element and 'AnalogCableService' element as service sources, the controller 228 can select any one of the 'IPMulticastAddress' element, 'RTSPURL' element, 'DigitalCableService' element and 'AnalogCableService' element based on the communication speed of the IP network, service source pay/free information, service source charging rate, content picture quality information provided by the service sources and user preference, and receive a service through a service source specified by the selected element.

Also, in the case where the 'VirtualChannelLocation' element includes at least two of the 'IPMulticastAddress' element, 'RTSPURL' element, 'DigitalCableService' element and 'AnalogCableService' element as service sources, the controller 228 may request the user to select any one of the 'IPMulticastAddress' element, 'RTSPURL' element, 'DigitalCableService' element and 'AnalogCableService' element. Provided that the user selects a specific service source, the controller 228 can receive a service through the service source selected by the user.

In the case where the 'IPMulticastAddress' element is selected as a service source, the controller 228 sends an IGMP message indicating that it will join multicasting based on an IP multicast address included in the 'IPMulticastAddress' element, and receives a service transmitted through the IP multicast address.

In the case where the 'RTSPURL' element is selected as a service source, the controller 228 receives a service indicated by a URL included in the 'RTSPURL' element in the unicast mode.

In the case where the 'DigitalCableService' element is selected as a service source, the controller 228 searches the cable network information record for a frequency specified by a 'CDSReference' element included in the 'DigitalCableService' element, tunes the tuner-1 212 or tuner-2 214 to the searched frequency, and receives a service transmitted based on a digital cable network through the tuner-1 212 or tuner-2 214.

In the case where the 'AnalogCableService' element is selected as a service source, the controller 228 searches the cable network information record for a frequency specified by a 'CDSReference' element included in the 'AnalogCableService' element, tunes the tuner-1 212 or tuner-2 214 to the searched frequency, and receives a service transmitted based on an analog cable network through the tuner-1 212 or tuner-2 214.

Figure 25:
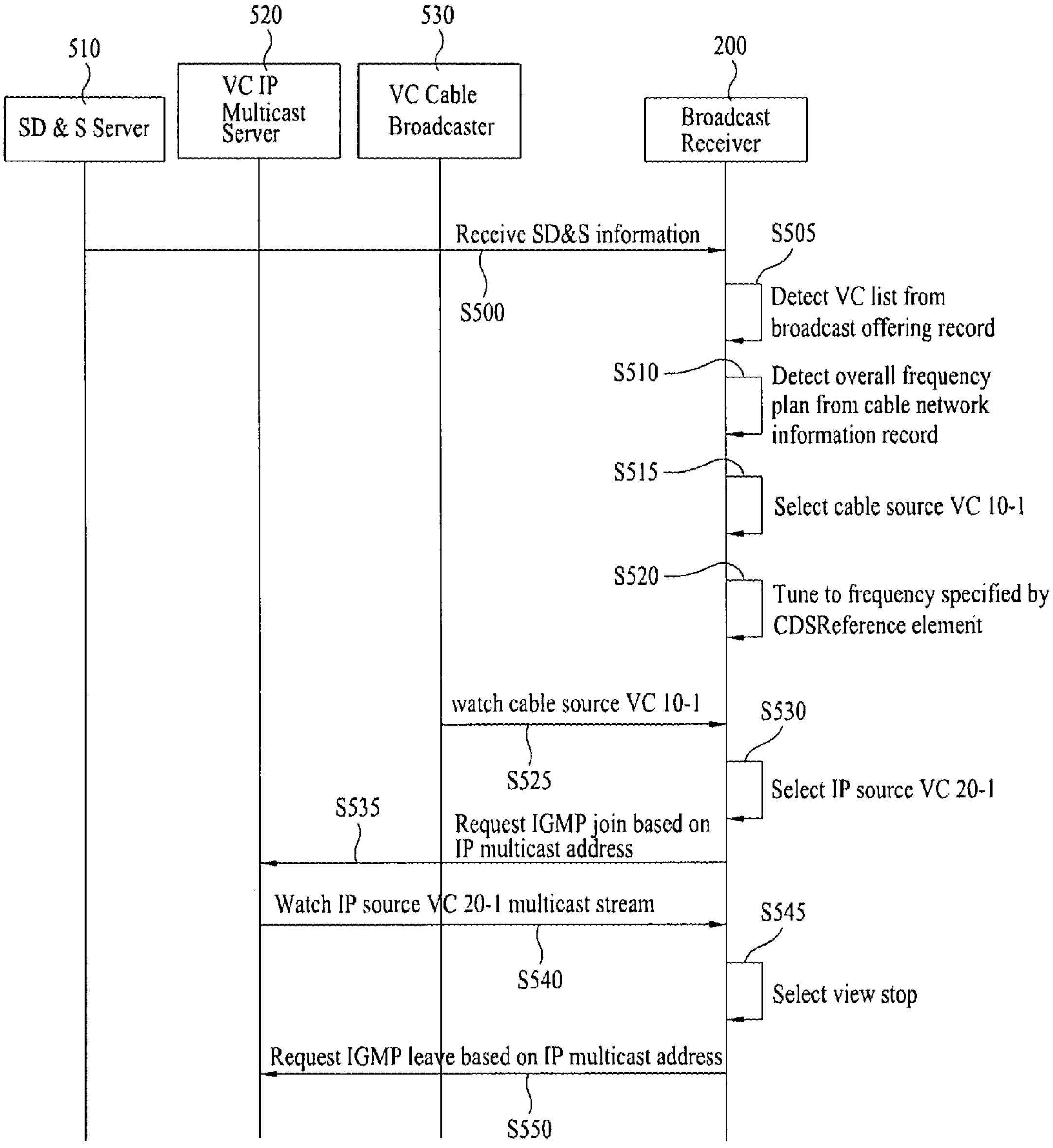
FIG. 25 is a flowchart illustrating a preferred embodiment of a channel information processing process according to the present invention.

FIG. 25 is a flowchart illustrating a preferred embodiment of a channel information processing process according to the present invention.

Referring to FIG. 25, an SD&S server 510 provides SD&S information (S500). Here, the SD&S information can be transmitted in an SD&S record. Here, the SD&S record includes an SP discovery record, broadcast offering record, COD discovery record, package discovery record, BCG record, and cable network information record.

The broadcast receiver 200 parses the broadcast offering record to detect a virtual channel list therefrom (S505). Then, the broadcast receiver 200 parses the cable network information record to detect a frequency plan for a physical channel therefrom, and constructs a frequency plan table based on the detected frequency plan (S510). Here, the broadcast receiver 200 may display the constructed frequency plan table.

The broadcast receiver 200 receives selection of cable source VC 10-1 by a viewer (S515).

The broadcast receiver 200 tunes to a frequency specified by a 'CDSReference' element of the cable source VC 10-1 (S520). That is, the broadcast receiver 200 can search the cable network information record for the frequency specified by the 'CDSReference' element, tune the tuner to the searched frequency, and receive the cable source VC 10-1.

The broadcast receiver 200 receives and displays the cable source VC 10-1 from a VC cable broadcaster 530 (S525).

The broadcast receiver 200 receives selection of IP source VC 20-1 by the viewer (S530).

The broadcast receiver 200 sends, to a VC IP multicast server 520, an IGMP message indicating that it will join multicasting based on an IP multicast address included in an 'IPMulticastAddress' element of the IP source VC 20-1 (S535).

The broadcast receiver 200 receives and displays a multicast stream of the IP source VC 20-1 (S540).

The broadcast receiver 200 receives selection of view stop by the viewer (S545). Then, the broadcast receiver 200 requests the VC IP multicast server 520 to remove the multicasting based on the IP multicast address (S550).

Figure 26:
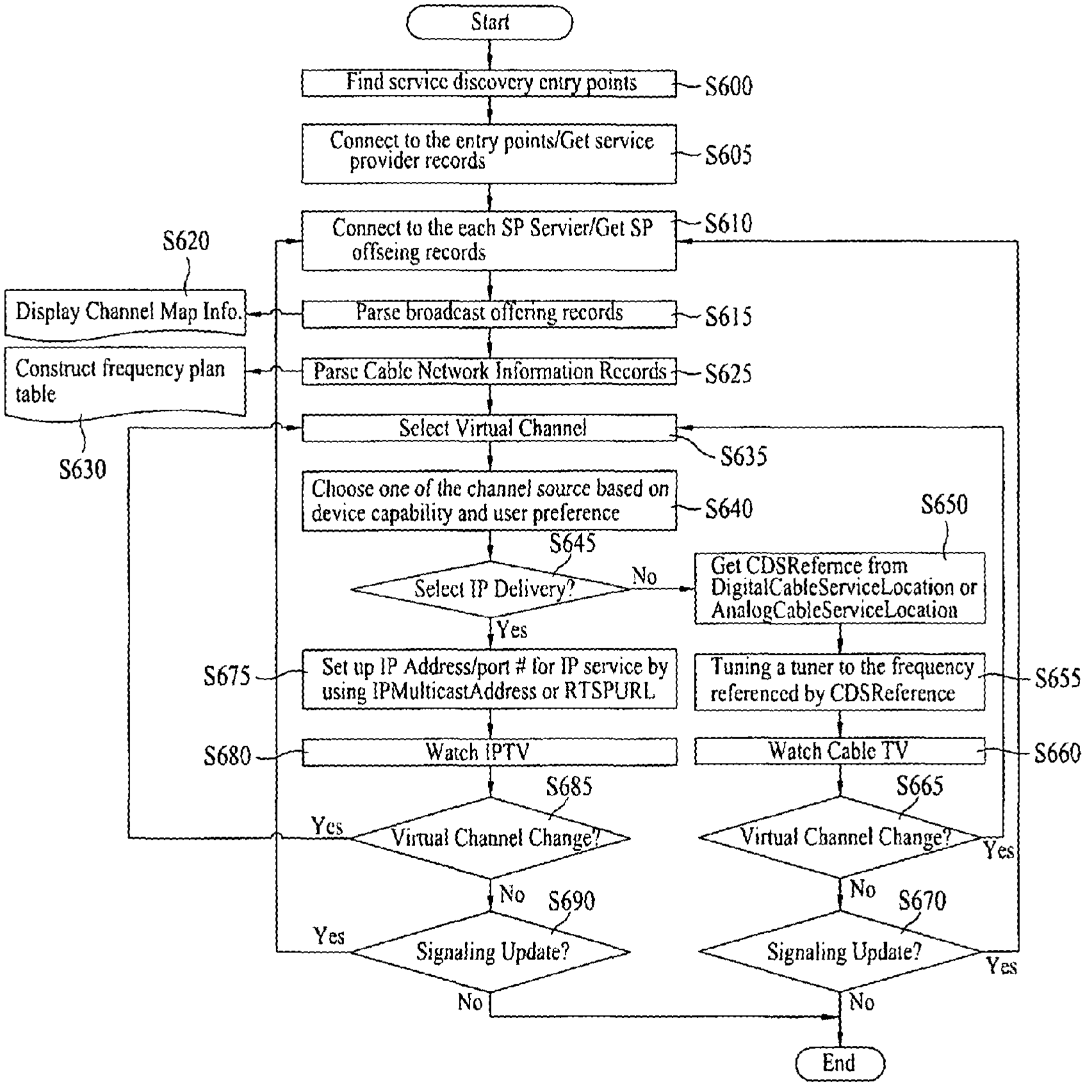
FIG. 26 is a flowchart illustrating an alternative embodiment of the channel information processing process according to the present invention.

FIG. 26 is a flowchart illustrating an alternative embodiment of the channel information processing process according to the present invention.

Referring to FIG. 26, the broadcast receiver 200 finds service discovery entry points (S600). Then, the broadcast receiver 200 connects to the found entry points and receives service provider discovery records including information on respective service providers (S605). Here, each service provider discovery record includes various information on a service provider, for example, service provider identification information, connection information, etc.

The broadcast receiver 200 connects to the respective service provider servers using information of the received service provider discovery records and receives SD&S records provided from the service provider servers (S610). Here, the SD&S records include broadcast offering records and cable network information records.

The broadcast receiver 200 parses the broadcast offering records to detect a virtual channel list therefrom (S615). Then, the broadcast receiver 200 displays the detected virtual channel list (S620).

The broadcast receiver 200 parses the cable network information records to detect frequency plan information therefrom (S625). Then, the broadcast receiver 200 constructs a frequency plan table based on the detected frequency plan information (S630).

The broadcast receiver 200 receives selection of a virtual channel by a viewer (S635).

The broadcast receiver 200 selects any one of service sources of the selected virtual channel based on device capability and user preference (S640). Here, the broadcast receiver 200 identifies a corresponding one of 'virtualchannel' elements included in a broadcast offering record of the channel selected by the viewer, finds a 'VirtualChannelLocation' element included in the identified 'virtualchannel' element, and receives a service provided over the channel selected by the viewer based on information included in the 'VirtualChannelLocation' element. In the case where the 'VirtualChannelLocation' element includes at least two of an 'IPMulticastAddress' element, 'RTSPURL' element, 'DigitalCableService' element and 'AnalogCableService' element as service sources, the broadcast receiver 200 can select any one of the 'IPMulticastAddress' element, 'RTSPURL' element, 'DigitalCableService' element and 'AnalogCableService' element based on the communication speed of the IP network, service source pay/free information, service source charging rate, content picture quality information provided by the service sources and user preference, and receive a service through the selected service source.

The broadcast receiver 200 determines whether an IP network-based service source has been selected (S645).

In the case where no IP network-based service source has been selected, the broadcast receiver 200 detects a 'CDSReference' element included in the 'DigitalCableService' element or 'AnalogCableService' element (S650). Then, the broadcast receiver 200 tunes the tuner-1 212 or tuner-2 214 to a frequency specified by the detected 'CDSReference' element (S655). The broadcast receiver 200 receives a service transmitted based on a cable network through the tuner-1 212 or tuner-2 214 (S660).

The broadcast receiver 200 determines whether there is a change in virtual channel (S665). When there is a change in virtual channel, the broadcast receiver 200 returns to step S635. However, when there is no change in virtual channel, the broadcast receiver 200 determines whether signaling has been updated (S670). Upon determining that signaling has been updated, the broadcast receiver 200 returns to step S610.

In the case where an IP network-based service source has been selected, the broadcast receiver 200 sets up an IP address and port number based on an IP multicast address included in the 'IPMulticastAddress' element or a URL included in the 'RTSPURL' element and connects to the service source (S675). Then, the broadcast receiver 200 receives a service transmitted based on an IP network from the connected service source (S680).

Then, the broadcast receiver 200 determines whether there is a change in virtual channel (S685). When there is a change in virtual channel, the broadcast receiver 200 returns to step S635. However, when there is no change in virtual channel, the broadcast receiver 200 determines whether signaling has been updated (S690). Upon determining that signaling has been updated, the broadcast receiver 200 returns to step S610.

As apparent from the above description, according to the broadcast receiver and channel information processing method of the present invention, it is possible to efficiently provide service information, provide information on services provided over a terrestrial/satellite/cable/IP network in an integrated manner, provide the integrated information on the services provided over the terrestrial/satellite/cable/IP network over the IP network, and provide channel information enabling stable provision of a service that a channel requested by the user provides.

In addition, it is possible to efficiently receive service information, receive information on services provided over a terrestrial/satellite/cable/IP network in an integrated manner, receive the integrated information on the services provided over the terrestrial/satellite/cable/IP network over the IP network, and stably receive a service that a channel requested by the user provides.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An IPTV receiver comprising:

a network interface for performing service discovery and receiving service information through an IP network, wherein the service information includes information about a service provider and a content provided by the service provider;

a tuner for tuning to a broadcast signal received through a broadcast channel;

a controller for parsing the service information to obtain virtual channel information from the service information; and obtaining source information including IP source information to acquire a content through the IP network and broadcast source information to acquire a content through a broadcast channel from the service information, wherein the broadcast source information includes carrier frequency information and modulation format information, wherein a content is received through the IP network by using the virtual channel information and the IP source information which are obtained through the IP network, when the IP network is selected, a content is received through the broadcast channel by using the virtual channel information and the broadcast source information which are obtained through the IP network, when the broadcast channel is selected.

2. The IPTV receiver according to claim 1, wherein the broadcast source information includes cable network information record for receiving a content through a cable broadcast network.

3. The IPTV receiver according to claim 1, wherein the controller further controls the tuner to tune to a frequency by using the virtual channel information and the broadcast source information when receiving a viewer input to select a virtual channel of a broadcast source; and to receive a content corresponding the selected virtual channel through the broadcast channel.

4. The IPTV receiver according to claim 1, wherein the controller, if a plurality of service sources are provided to provide the virtual channel, selects one of the plurality of service sources based on at least one of information about a communication speed of the IP network, service source charge information, content picture quality information provided by the service sources and user preference information.

5. The IPTV receiver according to claim 3, wherein the controller further controls the network interface to connect to a service source by using the virtual channel information and the IP source information when receiving a viewer input to select a virtual channel of a service source and to receive a content corresponding the selected virtual channel through the IP network.

6. A channel information processing method comprising:

performing service discovery and receiving service information through an IP network, wherein the service information includes information about a service provider and a content provided by the service provider;

parsing the service information;

obtaining virtual channel information from the service information;

obtaining source information including IP source information to acquire a content through the IP network and broadcast source information to acquire a content through a broadcast channel from the service information, wherein the broadcast source information includes carrier frequency information and modulation format information;

receiving a content through the IP network by using the virtual channel information and the IP source information which are obtained through the IP network, when the IP network is selected; and receiving a content through the broadcast channel by using the virtual channel information and the broadcast source information which are obtained through the IP network, when the broadcast channel is selected.

7. The channel information processing method according to claim 6, wherein the broadcast source information includes cable network information record for receiving the content through a cable broadcast network.

8. The channel information processing method according to claim 6, the method further comprising;

tuning to a frequency by using the virtual channel information and the broadcast source information when receiving a viewer input to select a virtual channel of a broadcast source, wherein the content received through the broadcast channel corresponds to the selected virtual channel.

9. The channel information processing method according to claim 8, further comprising:

connecting to a service source by using the virtual channel information and the IP source information when receiving a viewer input to select a virtual channel of a service source, wherein the content received through the IP network corresponds to the selected virtual channel.

10. The channel information processing method according to claim 6, further comprising:

receiving a view request for the virtual channel from a viewer;

identifying the source information for the requested virtual channel based on the virtual channel information; and if a plurality of service sources are provided to provide the virtual channel, selecting one of the plurality of service sources based on at least one of information about a communication speed of the IP network, service source charge information, content picture quality information provided by the service sources and user preference information.

* * * * *